(12) United States Patent
Chang et al.

(10) Patent No.: US 8,948,474 B2
(45) Date of Patent: Feb. 3, 2015

(54) QUANTIFICATION METHOD OF THE FEATURE OF A TUMOR AND AN IMAGING METHOD OF THE SAME

(75) Inventors: King Jen Chang, Taipei (TW); Wen Hwa Chen, Taipei (TW); Argon Chen, Zhonghe (TW); Chiung Nein Chen, Jiali Township, Tainan County (TW); Ming Chih Ho, Taipei (TW); Hao Chih Tai, Taipei (TW); Ming Hsun Wu, Taipei (TW); Po Wei Tsai, Yonghe (TW); Chung Wei Liu, Fengshan (TW); Hsin-Jung Wu, Taiping (TW)

(73) Assignee: Amcad BioMed Corporation, Taipei (TW)

( * ) Notice: Subject to any disclaimer, the term of this patent is extended or adjusted under 35 U.S.C. 154(b) by 1069 days.

(21) Appl. No.: 12/693,253

(22) Filed: Jan. 25, 2010

(65) Prior Publication Data
US 2011/0181614 A1 Jul. 28, 2011

(51) Int. Cl.
G06K 9/00 (2006.01)
G06T 7/00 (2006.01)
G06T 7/40 (2006.01)

(52) U.S. Cl.
CPC ............ *G06T 7/0012* (2013.01); *G06T 7/0083* (2013.01); *G06T 7/0087* (2013.01); *G06T 7/401* (2013.01); *G06T 2207/10132* (2013.01); *G06T 2207/30096* (2013.01)
USPC ........................................................ 382/128

(58) Field of Classification Search
CPC .................................................... G06T 7/0012
USPC ................................................ 382/128–133
See application file for complete search history.

(56) References Cited

U.S. PATENT DOCUMENTS

| | | | |
|---|---|---|---|
| 5,224,175 A | 6/1993 | Gouge et al. | |
| 6,078,680 A | 6/2000 | Yoshida et al. | |
| 6,137,899 A * | 10/2000 | Lee et al. | 382/133 |
| 6,173,083 B1 * | 1/2001 | Avinash | 382/260 |
| 6,898,303 B2 * | 5/2005 | Armato et al. | 382/131 |
| 7,684,596 B2 * | 3/2010 | Watson et al. | 382/128 |
| 7,689,016 B2 * | 3/2010 | Stoecker et al. | 382/128 |

(Continued)

OTHER PUBLICATIONS

Chen et al. "Computerized Detection and Quantification of Microcalcifications in Thyroid Nodules". Ultrasound in Medicine & Biology, vol. 37, Issue 6; Jun. 2011; pp. 870-878.*

(Continued)

*Primary Examiner* — Robert Sorey
(74) *Attorney, Agent, or Firm* — Muncy, Geissler, Olds & Lowe, P.C.

(57) ABSTRACT

A quantification method and an imaging method are disclosed, capable of quantifying the margin feature, the cysts feature, the calcifications feature, the echoic feature and the heterogenesis feature of a tumor, and capable of imaging the margin feature, the cysts feature, the calcifications feature and the heterogenesis feature of a tumor. The quantification method and the imaging method calculate the moving variance of the gray scale of each of the pixel points based on the gradient value of the gray scale of these pixel points. Then, depending on the purpose of the quantification method or the imaging method, the maximum value, the minimum value, the mean value, and the standard deviation of the moving variance of the gray scale of these pixel points are calculated, respectively. At final, with the definition of the threshold value and the imaging rule, the above features of the tumor are quantified or imaged.

9 Claims, 24 Drawing Sheets

(56) References Cited

U.S. PATENT DOCUMENTS

| | | | |
|---|---|---|---|
| 7,822,255 B2 * | 10/2010 | Schutz | 382/132 |
| 8,744,157 B2 * | 6/2014 | Valadez | 382/131 |
| 2002/0006216 A1 * | 1/2002 | Armato et al. | 382/131 |
| 2003/0223627 A1 * | 12/2003 | Yoshida et al. | 382/128 |
| 2004/0013292 A1 * | 1/2004 | Raunig | 382/128 |
| 2006/0269111 A1 * | 11/2006 | Stoecker et al. | 382/128 |
| 2008/0118136 A1 * | 5/2008 | Cai et al. | 382/131 |
| 2008/0317325 A1 * | 12/2008 | Ortyn et al. | 382/133 |
| 2010/0111396 A1 * | 5/2010 | Boucheron | 382/133 |
| 2010/0150413 A1 * | 6/2010 | Futamura | 382/128 |
| 2010/0260396 A1 * | 10/2010 | Brandt et al. | 382/131 |
| 2010/0284588 A1 * | 11/2010 | Valadez | 382/128 |
| 2011/0026788 A1 * | 2/2011 | Elter et al. | 382/128 |
| 2011/0096965 A1 * | 4/2011 | Ni et al. | 382/128 |

OTHER PUBLICATIONS

Yair Zimmer, Ron Tepper, Solange Akselrod, An Automatic Approach for Morphological Analysis and Malignancy Evaluation of Ovarian Masses Using B-scans, Ultrasound in Medicine and Biology, 2003, p. 1561-1570, 29(11).

Khaled Taouil, Nadra Ben Romdhane, Automatic Segmentation and classification of Skin Lesion Images, Distributed Frameworks for Multimedia Applications, The 2nd International Conference on May 2006, p. 1-12, Pulau Pinang.

* cited by examiner defining a threshold value for calculating the ratio of the region having the cysts feature over the tumor inner region, based on both the minimum value and the standard deviation of the gradient value of the gray scale of the plurality pixel points in the tumor inner region ~ D1

FIG.6C defining a threshold value for calculating the ratio of the region having the calcifications feature over the tumor inner region, based on the maximum value, the standard deviation, and the mean value of the gradient value of the gray scale of the plurality pixel points in the tumor inner region but outside the cysts region ~F1

FIG.8C defining a threshold value for calculating the ratio of
the region having the heterogenesis feature over the
tumor inner region, based on the heterogenesis index
for each of the plurality of the reference masks ~ F1

FIG.11C

QUANTIFICATION METHOD OF THE FEATURE OF A TUMOR AND AN IMAGING METHOD OF THE SAME

BACKGROUND OF THE INVENTION

1. Field of the Invention

The present invention relates to a quantification method and an imaging method, and more particularly, to the quantification method capable of quantifying the margin feature, the cysts feature, the calcifications feature, the echoic feature and the heterogenesis feature of a tumor, and to the imaging method capable of imaging the margin feature, the cysts feature, the calcifications feature and the heterogenesis feature of a tumor.

2. Description of Related Art

In recent years, since the resolution of the image and the digitized process of the image of the medical use ultrasonic imaging technology have both increased significantly, the application filed of the medical use ultrasonic imaging technology is not limited in monitoring the growth of a baby anymore. The medical use ultrasonic imaging technology is gradually used in the diagnosis of the nature of many kinds of tumor, such as the thyroid tumor. Moreover, due to the non invasion imaging nature of the medical use ultrasonic imaging technology, more and more doctors uses the medical use ultrasonic imaging technology as an assistance in diagnosing the nature of a tumor and evaluating the possible treatments to the tumor.

The first step for a doctor to diagnose the nature of a tumor through an ultrasonic image is to identify the contour of the tumor, i.e. the tumor contour, for defining the tumor inner region and the tumor external region in the ultrasonic image. Then, the doctor can identify the features of the tumor, such as the margin feature, the cysts feature, the calcifications feature, the echoic feature and the heterogenesis in the tumor inner region, as the reference for diagnosing the nature of the tumor. However, the medical use ultrasonic imaging system of the present time can only allow the doctor to input the tumor contour identified by his naked eyes to the ultrasonic image of the tumor, with the help of a handwriting input device. But, the unreliability of the diagnosis of the nature of the tumor is significant just due to this tumor contour identifying process, for the reasons below:

The tumor contour identifying process mainly depends on the subjective feeling and experience of the doctor, even the mental condition of the doctor can also plays an important role in it. As a result, for a certain ultrasonic image of a tumor, the tumor contours indentified by different doctors are different from each other, as shown in FIG. 1A. Moreover, even for the same doctor, the tumor contours identified at different time slot are different from each other, either.

After that, with the assistance of the identified tumor contour, the doctor can identify whether the above features of the tumor is existed in the tumor inner region by his naked eyes. And if there exists at least one of the above features of the tumor in the tumor inner region, the ratio of the at least one of the above features of the tumor in the tumor inner region is evaluated by the doctor. At final, based on the results collected on hand, such as the distribution of certain kind of feature of the tumor, the doctor diagnoses the nature of the tumor. In other words, no objective mechanism exists in the present diagnosis process of the nature of a tumor, based on the ultrasonic image. Therefore, mistakes on diagnosis of the nature of a tumor exist from time to time, decreasing the reliability of the diagnosis process of the nature of a tumor by the medical use ultrasonic imaging technology to the medical field and the society.

Besides, lots of image margin identification methods have been proposed in the image identification field (such as the license identification field) for example, the snake algorithms. However, before the snake algorithms starts to work, the uses needs to input a preliminary margin into the algorithms, which means the doctor still needs to input a rough tumor contour through the handwriting input device. Then, the snake algorithms continues to execute the following algorithm process. But, due to the intrinsic property thereof, the snake algorithms is preferably applied in the case of the image having obvious margin, or the result of the snake algorithms will be extremely different from the actual margin. However, in most cases, the margin of a tumor is not obvious, i.e. the margin of the tumor is always blurred. Therefore, even with the snake algorithms, the resulting tumor contour is still quite different from the actual contour of the tumor, ash shown in FIG. 1B.

Besides, for decreasing the calculation time of the snake algorithms, the doctor still needs to spend lot of time to input a preliminary margin close to the actual tumor contour into the algorithms. Thus, the burden of the doctor is not released significantly. Moreover, since the ultrasonic image is a gray scale image, the features of the tumor (such as the margin feature, the cysts feature, the calcifications feature, the echoic feature and the heterogenesis feature) may be displayed as minor change of the gradient value of the gray scale of some of the pixel points of the gray scale image, which is hard to identify by the naked eyes of the doctor. Therefore, the doctor can only identify the existence of these features of a tumor by his feeling, making the diagnosing process of the nature of a tumor merely depending on the subjective feeling of the doctor, not depending on the objective facts.

Therefore, a quantification method capable of quantifying the margin feature, the cysts feature, the calcifications feature, the echoic feature and the heterogenesis feature of a tumor, and an imaging method capable of imaging the margin feature, the cysts feature, the calcifications feature and the heterogenesis feature of a tumor are required in the field.

SUMMARY OF THE INVENTION

The object of the present invention is to provide a quantification method capable of quantifying the margin feature, the cysts feature, the calcifications feature, the echoic feature and the heterogenesis feature of a tumor, for the diagnosis of a doctor.

The object of the present invention is to provide an imaging method capable of imaging the margin feature, the cysts feature, the calcifications feature and the heterogenesis feature of a tumor, for the diagnosis of a doctor.

To achieve the object, the quantification method of the margin feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) retrieving a center of gravity of the tumor contour annular region, defining a section line extending outwardly from the center of gravity and penetrating the tumor contour annular region, and providing a measured line segment being on the section line and in the tumor contour annular region; (D) calculating the moving variance of the gray scale of each of the plurality pixel points on the measured line segment; and (E) quantifying the margin feature of the tumor on the section line, based on the moving variance of the gray scale of each of the plurality pixel points on the measured line segment.

To achieve the object, the imaging method of the margin feature of a tumor, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) retrieving a center of gravity of the tumor contour annular region, defining a section line extending outwardly from the center of gravity and penetrating the tumor contour annular region, and providing a measured line segment being on the section line and in the tumor contour annular region; (D) calculating the moving variance of the gray scale of each of the plurality pixel points on the measured line segment; and (E) defining a margin imaging upper limit and a margin imaging lower limit based on the moving variance of the gray scale of each of the plurality pixel points on the measured line segment, and imaging the margin feature of the tumor on the section line in coordination with a rainbow level.

To achieve the object, the quantification method of the cysts feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; and (D) quantifying the cysts feature of the tumor in the tumor inner region, based on both the minimum value and the standard deviation of the gradient value of the gray scale of the plurality pixel points in the tumor inner region.

To achieve the object, the imaging method of the cysts feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; and (D) defining a cysts imaging upper limit and a cysts imaging lower limit based on both the minimum value and the standard deviation of the gradient value of the gray scale of the plurality pixel points in the tumor inner region, and imaging the cysts feature of the tumor in the tumor inner region.

To achieve the object, the quantification method of the calcifications feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; (D) retrieving a cysts region in the tumor inner region based on both the minimum value and the standard deviation of the gradient value of the gray scale of the plurality pixel points in the tumor inner region; (E) calculating the maximum value, the standard deviation, and the mean value of the gradient value of the gray scale of the plurality pixel points in the tumor inner region but outside the cysts region; and (F) quantifying the calcifications feature of the tumor in the tumor inner region, based on the maximum value, the standard deviation, and the mean value of the gradient value of the gray scale of the plurality pixel points in the tumor inner region but outside the cysts region.

To achieve the object, the imaging method of the calcifications feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; (D) retrieving a cysts region in the tumor inner region based on both the minimum value and the standard deviation of the gradient value of the gray scale of the plurality pixel points in the tumor inner region; (E) calculating the maximum value, the standard deviation, and the mean value of the gradient value of the gray scale of the plurality pixel points in the tumor inner region but outside the cysts region, based on the gradient value of the gray scale of each of the plurality pixel points in the tumor inner region but outside the cysts region; and (F) defining a calcifications imaging upper limit and a calcifications imaging lower limit based on the maximum value, the standard deviation, and the mean value of the gradient value of the gray scale of the plurality pixel points in the tumor inner region but outside the cysts region, and imaging the calcifications feature of the tumor in the tumor inner region.

To achieve the object, the quantification method of the echoic feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating the mean value of the gradient value of the gray scale of the plurality pixel points in the tumor inner region; (D) selecting a reference block in the tumor external region, and calculating the mean value of the gradient value of the gray scale of the plurality pixel points in the reference block based on the gradient value of each of the gray scale of the plurality pixel points in the reference block; and (E) quantifying the echoic feature of the tumor based on the mean value of the gradient value of the gray scale of the plurality pixel points in the tumor inner region and the mean value of the gradient value of the gray scale of the plurality pixel points in the reference block.

To achieve the object, the quantification method of the heterogenesis feature of a tumor of the present invention, applying on a gray scale image consisting of a plurality of pixel points and displaying at least one tumor therein, comprising the steps of (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) defining a plurality of reference masks from the plurality pixel points in the tumor inner region, each of the plurality of reference masks including a reference pixel point and plural pixels points adjacent to the reference pixel point; (D) calculating the local mean and the local variance of the gradient value of the gray scale of the reference mask for each of the plurality of reference masks; (E) calculating the variance of local mean, the mean of local variance, and the variance of local variance of the gradient value of the gray scale of the reference mask of the plurality of reference masks; and (F) quantifying the heterogenesis feature of the tumor by the calculation of a heterogenesis index for each of the plurality of the reference masks, based on at least one selected from a group consisted of the variance of local mean, the mean of local variance, and the variance of local variance of the gradient value of the gray scale of the reference mask for each of the plurality of reference masks.

To achieve the object, the imaging method of the heterogenesis feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) defining a plurality of reference masks from the plurality pixel points in the tumor inner region, each of the plurality of reference masks including a reference pixel point and plural pixels points adjacent to the reference pixel point; (D) calculating the variance of the gradient value of the gray scale of the reference mask for each of the plurality of reference masks; (E) calculating the mean variance of the gradient value of the gray scale of the reference mask of the plurality of reference masks; (F) calculating of a heterogenesis index for each of the plurality of the reference masks, based on the variance of the gradient value of the gray scale of the reference mask for each of the plurality of reference masks; (G) calculating the maximum value, the minimum value, the mean value, and the standard deviation of the heterogenesis indices of the plurality of the reference masks, based on the heterogenesis index for each of the plurality of the reference masks; and (H) defining a heterogenesis imaging upper limit and a heterogenesis imaging lower limit based on the maximum value, the minimum value, the mean value, and the standard deviation of the heterogenesis indices of the plurality of the reference masks, and imaging the heterogenesis feature of the tumor in the tumor inner region in coordination with a rainbow level.

A computer readable medium storing a computer program for making a computer system to execute a quantification method of the margin feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) retrieving a center of gravity of the tumor contour annular region, defining a section line extending outwardly from the center of gravity and penetrating the tumor contour annular region, and providing a measured line segment being on the section line and in the tumor contour annular region; (D) calculating the moving variance of the gray scale of each of the plurality pixel points on the measured line segment; and (E) quantifying the margin feature of the tumor on the section line, based on the moving variance of the gray scale of each of the plurality pixel points on the measured line segment.

A computer readable medium storing a computer program for making a computer system to execute an imaging method of the margin feature of a tumor, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) retrieving a center of gravity of the tumor contour annular region, defining a section line extending outwardly from the center of gravity and penetrating the tumor contour annular region, and providing a measured line segment being on the section line and in the tumor contour annular region; (D) calculating the moving variance of the gray scale of each of the plurality pixel points on the measured line segment; and (E) defining a margin imaging upper limit and a margin imaging lower limit based on the moving variance of the gray scale of each of the plurality pixel points on the measured line segment, and imaging the margin feature of the tumor on the section line in coordination with a rainbow level.

A computer readable medium storing a computer program for making a computer system to execute a quantification method of the cysts feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; and (D) quantifying the cysts feature of the tumor in the tumor inner region, based on both the minimum value and the standard deviation of the gradient value of the gray scale of the plurality pixel points in the tumor inner region.

A computer readable medium storing a computer program for making a computer system to execute an imaging method of the cysts feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; and (D) defining a cysts imaging upper limit and a cysts imaging lower limit based on both the minimum value and the standard deviation of the gradient value of the gray scale of the plurality pixel points in the tumor inner region, and imaging the cysts feature of the tumor in the tumor inner region.

A computer readable medium storing a computer program for making a computer system to execute a quantification method of the calcifications feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; (D) retrieving a cysts region in the tumor inner region based on both the minimum value and the standard deviation of the gradient value of the gray scale of the plurality pixel points in the tumor inner region; (E) calculating the maximum value, the standard deviation, and the mean value of the gradient value of the gray scale of the plurality pixel points in the tumor inner region but outside the cysts region; and (F) quantifying the calcifications feature of the tumor in the tumor inner region, based on the maximum value, the standard deviation, and the mean value of the gradient value of the gray scale of the plurality pixel points in the tumor inner region but outside the cysts region.

A computer readable medium storing a computer program for making a computer system to execute an imaging method of the calcifications feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating both the minimum value and the standard deviation of the gradient value of the gray scale of the plurality pixel points in the tumor inner region; (D) retrieving a cysts region in the tumor inner region based on both the minimum value and the standard deviation of the gradient value of the gray scale of the plurality pixel points in the tumor inner region; (E) calculating the maximum value, the standard deviation, and the mean value of the gradient value of the gray scale of the plurality pixel points in the tumor inner region but outside the cysts region, based on the gradient value of the gray scale of each of the plurality pixel points in the tumor inner region but outside the cysts region; and (F) defining a calcifications imaging upper limit and a calcifications imaging lower limit based on the maximum value, the standard deviation, and the mean value of the gradient value of the gray scale of the plurality pixel points in the tumor inner region but outside the cysts region, and imaging the calcifications feature of the tumor in the tumor inner region.

A computer readable medium storing a computer program for making a computer system to execute a quantification method of the echoic feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) calculating the mean value of the gradient value of the gray scale of the plurality pixel points in the tumor inner region; (D) selecting a reference block in the tumor external region, and calculating the mean value of the gradient value of the gray scale of the plurality pixel points in the reference block based on the gradient value of each of the gray scale of the plurality pixel points in the reference block; and (E) quantifying the echoic feature of the tumor based on the mean value of the gradient value of the gray scale of the plurality pixel points in the tumor inner region and the mean value of the gradient value of the gray scale of the plurality pixel points in the reference block.

A computer readable medium storing a computer program for making a computer system to execute a quantification method of the heterogenesis feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) defining a plurality of reference masks from the plurality pixel points in the tumor inner region, each of the plurality of reference masks including a reference pixel point and plural pixels points adjacent to the reference pixel point; (D) calculating the local mean and the local variance of the gradient value of the gray scale of the reference mask for each of the plurality of reference masks; (E) calculating the variance of local mean, the mean of local variance, and the variance of local variance of the gradient value of the gray scale of the reference mask of the plurality of reference masks; and (F) quantifying the heterogenesis feature of the tumor by the calculation of a heterogenesis index for each of the plurality of the reference masks, based on at least one selected from a group consisted of the variance of local mean, the mean of local variance, and the variance of local variance of the gradient value of the gray scale of the reference mask for each of the plurality of reference masks.

A computer readable medium storing a computer program for making a computer system to execute an imaging method of the heterogenesis feature of a tumor of the present invention, applying on a gray scale image consisting of a plurality of pixel points and displaying at least one tumor therein, comprising the steps of: (A) retrieving a tumor contour and a tumor contour annular region from the gray scale image, wherein the tumor contour is in the tumor contour annular region; (B) displaying the tumor contour over the gray scale image for defining a tumor inner region and a tumor external region on the gray scale image; (C) defining a plurality of reference masks from the plurality pixel points in the tumor inner region, each of the plurality of reference masks including a reference pixel point and plural pixels points adjacent to the reference pixel point; (D) calculating the variance of the gradient value of the gray scale of the reference mask for each of the plurality of reference masks; (E) calculating the mean variance of the gradient value of the gray scale of the reference mask of the plurality of reference masks; (F) calculating of a heterogenesis index for each of the plurality of the reference masks, based on the variance of the gradient value of the gray scale of the reference mask for each of the plurality of reference masks; (G) calculating the maximum value, the minimum value, the mean value, and the standard deviation of the heterogenesis indices of the plurality of the reference masks, based on the heterogenesis index for each of the plurality of the reference masks; and (H) defining a heterogenesis imaging upper limit and a heterogenesis imaging lower limit based on the maximum value, the minimum value, the mean value, and the standard deviation of the heterogenesis indices of the plurality of the reference masks, and imaging the heterogenesis feature of the tumor in the tumor inner region in coordination with a rainbow level.

As a result, with the quantification method of the margin feature of a tumor, the imaging method of the margin feature of a tumor, the quantification method of the cysts feature of a tumor, the imaging method of the cysts feature of a tumor, the quantification method of the calcifications feature of a tumor, the imaging method of the calcifications feature of a tumor, the quantification method of the echoic feature of a tumor, the quantification method of the heterogenesis feature of a tumor, and the imaging method of the heterogenesis feature of a tumor, a doctor can obtain both the quantified result of these features and the imaging result of these features (in the form of image pattern) at the same time when the ultrasonic gray scale image is available to him, as the reference for the doctor to diagnose the nature of the tumor. Thus, both the accuracy and the reliability of the diagnosis of the nature of a tumor thorough the ultrasonic gray scale image can thus be increased. The burden of the doctor on the diagnosis of the nature of a tumor is also released.

Other objects, advantages, and novel features of the invention will become more apparent from the following detailed description when taken in conjunction with the accompanying drawings.

BRIEF DESCRIPTION OF THE DRAWINGS

FIG. 6C is the flowchart displaying the substep of step (E) of the quantification method of the cysts feature of a tumor according to the third embodiment of the present invention.

FIG. 8C is the flowchart displaying the substep of step (F) of the quantification method of the calcifications feature of a tumor according to the fifth embodiment of the present invention.

FIG. 11C is the flowchart displaying the substeps of step (F) of the quantification method of the heterogenesis feature of a tumor according to the eighth embodiment of the present invention.

DETAILED DESCRIPTION OF THE PREFERRED EMBODIMENT

Figure 1A:
FIG. 1A is the ultrasonic image whose tumor contour is labeled by a doctor's hand.
Figure 1B:
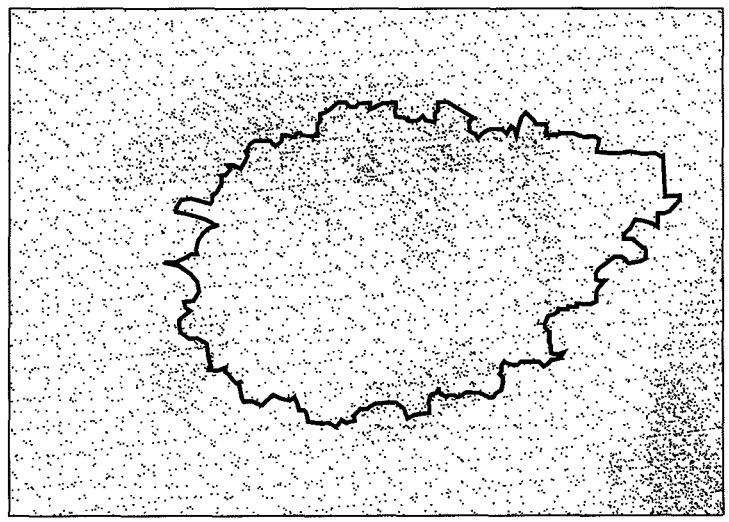
FIG. 1B is the ultrasonic image whose tumor contour is calculated and labeled by the snake algorithms.
Figure 2:
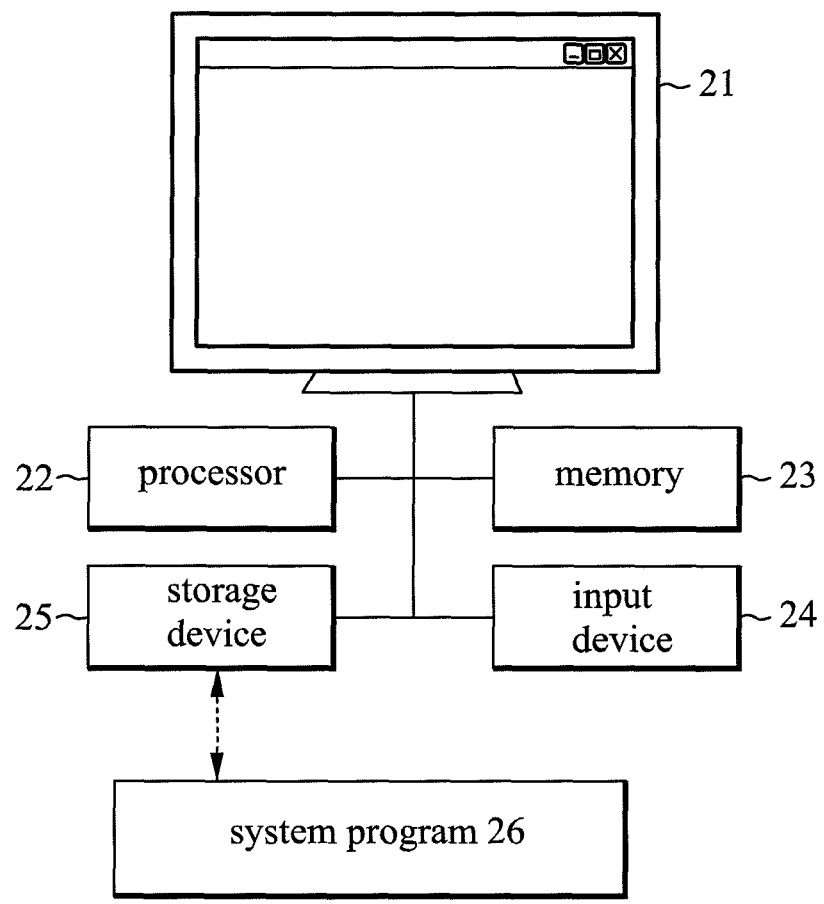
FIG. 2 displays the structure of a computer system.

With reference to FIG. 2, a computer system is shown. The computer system is capable of executing the quantification method of the margin feature of a tumor, the imaging method of the margin feature of a tumor, the quantification method of the cysts feature of a tumor, the imaging method of the cysts feature of a tumor, the quantification method of the calcifications feature of a tumor, the imaging method of the calcifications feature of a tumor, the quantification method of the echoic feature of a tumor, the quantification method of the heterogenesis feature of a tumor, and the imaging method of the heterogenesis feature of a tumor of the present invention.

As shown in FIG. 2, a computer system comprises: a display device 21, a processor 22, a memory 23, an input device 24 and a storage device 25, wherein data such as image, words, instructions, etc. could be input through the input device 24. The storage device 25 could be a hard drive, a CD-ROM drive or a remote database coupled with the Internet, for storing a system program, application program and the data of the user. The memory 23 is used to register the data or the program to be executed. The processor 22 is used to compute and process data. The display device 21 displays the output data. The computer system of FIG. 2 executes kinds of application programs under on the basis of the system program 26, such as the word processing program, drawing program, scientific calculation program, browsing program and e-mail program, etc.

In the present embodiment, the storage device 25 stores the computer program making a computer system to execute a quantification method of the margin feature of a tumor, the computer program making a computer system to execute an imaging method of the margin feature of a tumor, the computer program for making a computer system to execute a quantification method of the cysts feature of a tumor, the computer program for making a computer system to execute an imaging method of the cysts feature of a tumor, the computer program for making a computer system to execute a quantification method of the calcifications feature of a tumor, the computer program for making a computer system to execute an imaging method of the calcifications feature of a tumor, the computer program for making a computer system to execute a quantification method of the echoic feature of a tumor, the computer program for making a computer system to execute a quantification method of the heterogenesis feature of a tumor, and the computer program for making a computer system to execute an imaging method of the heterogenesis feature of a tumor. Once the computer system is subject to execute a quantification method or an imaging method, the corresponding computer program is loaded to the memory 23, for executing the quantification method or the imaging method in the processor 22. At final, the result of the quantification method or the imaging method is displayed on the display device 21 or stored in the remote database coupled with the Internet.

Besides, the ultrasonice gray scale image is stored in the storage device 25, and the ultrasonice gray scale image is loaded to the memory 23 as the quantification method or the imaging method being executed. Moreover, the preliminary tumor contour of the tumor contour retrieving method is input to the computer system through the input device 24. The preliminary tumor contour is then integrated with the ultrasonice gray scale image, for the execution of the following steps.

Figure 3A:
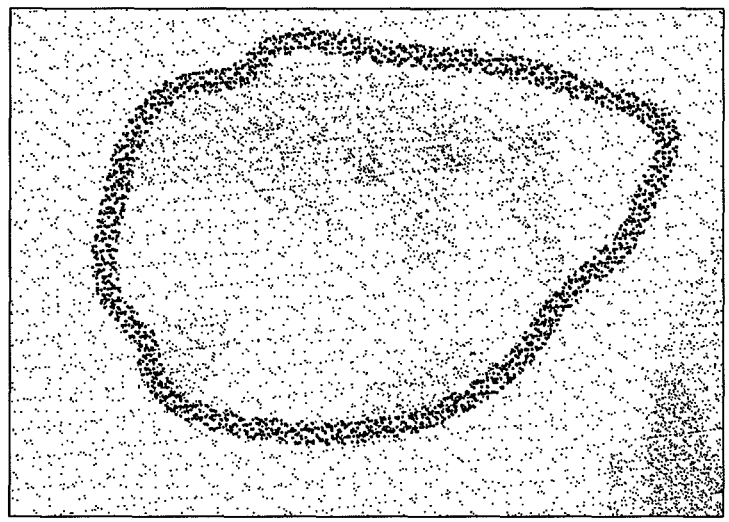
FIG. 3A is an ultrasonic gray scale image.

FIG. 3A displays an ultrasonic gray scale image consisting of a plurality of pixel points, wherein each of the plurality of pixel points has a gradient value of the gray scale. Besides, the ultrasonic gray scale image of FIG. 3A displays a thyroid tumor and the surrounding thyroid tissue.

Figure 3B:
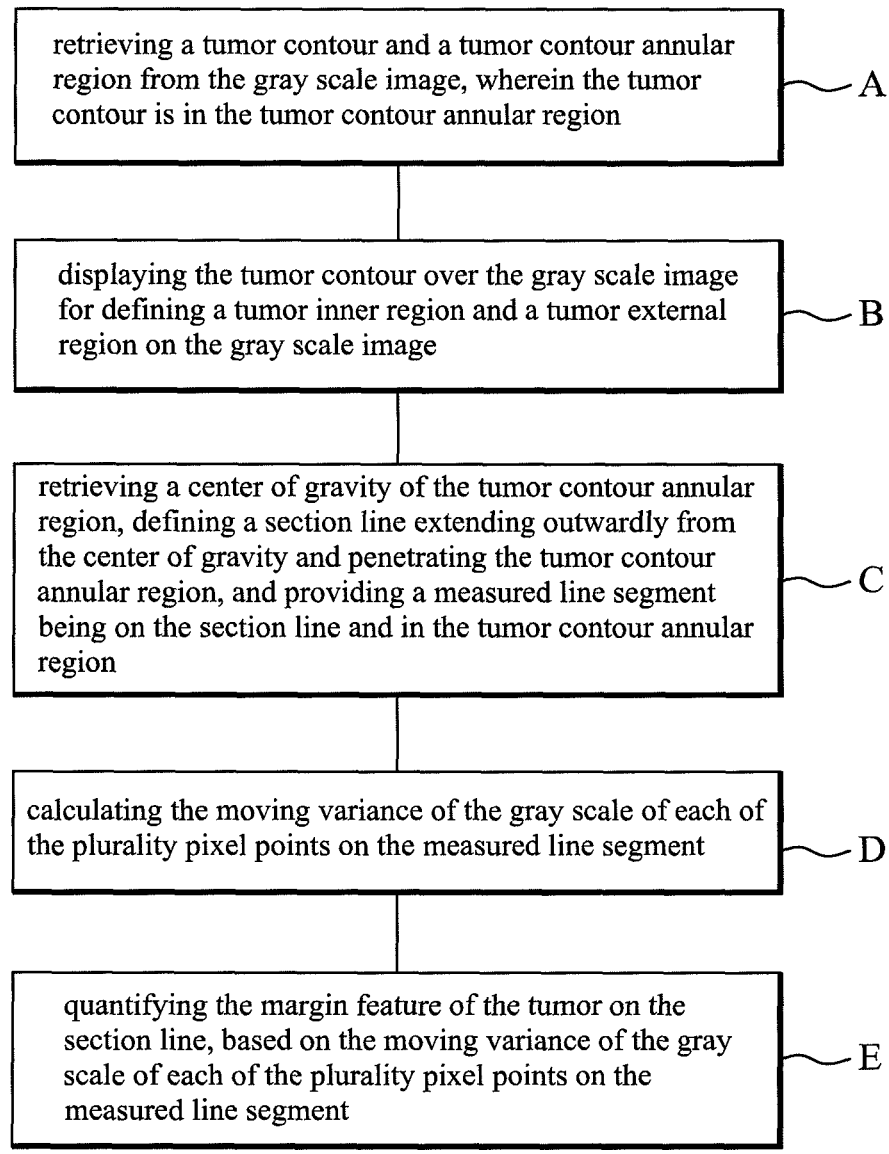
FIG. 3B is a flowchart of the quantification method of the margin feature of a tumor according to the first embodiment of the present invention.

Besides, as shown in FIG. 3B, which is a flowchart of the quantification method of the margin feature of a tumor according to the first embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) retrieving a center of gravity of the tumor contour annular region, defining a section line extending outwardly from the center of gravity and penetrating the tumor contour annular region, and providing a measured line segment being on the section line and in the tumor contour annular region;

(D) calculating the moving variance of the gray scale of each of the plurality pixel points on the measured line segment; and (E) quantifying the margin feature of the tumor on the section line, based on the moving variance of the gray scale of each of the plurality pixel points on the measured line segment.

Figure 3C:
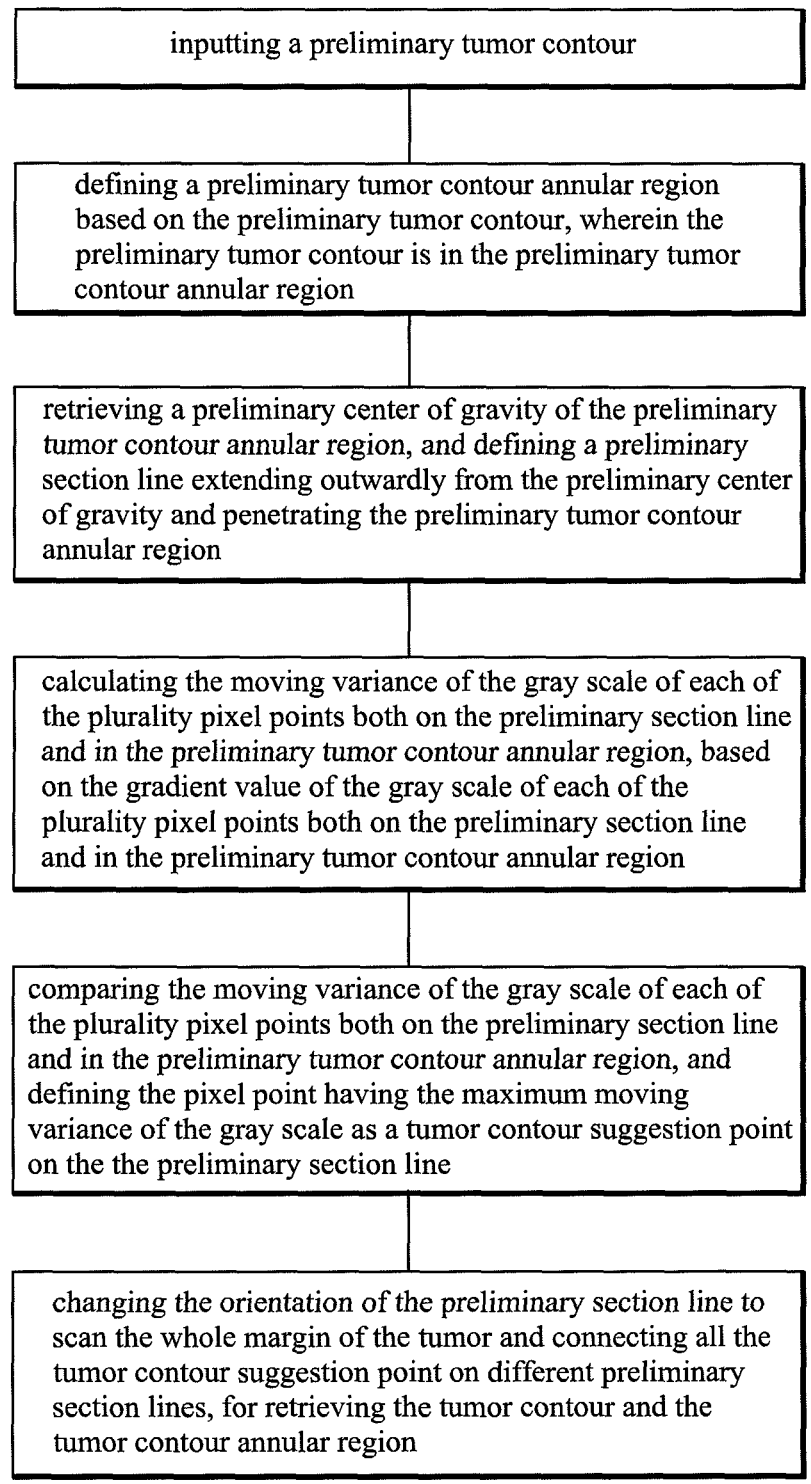
FIG. 3C is the flowchart of the tumor contour retrieving method.
Figure 3D:
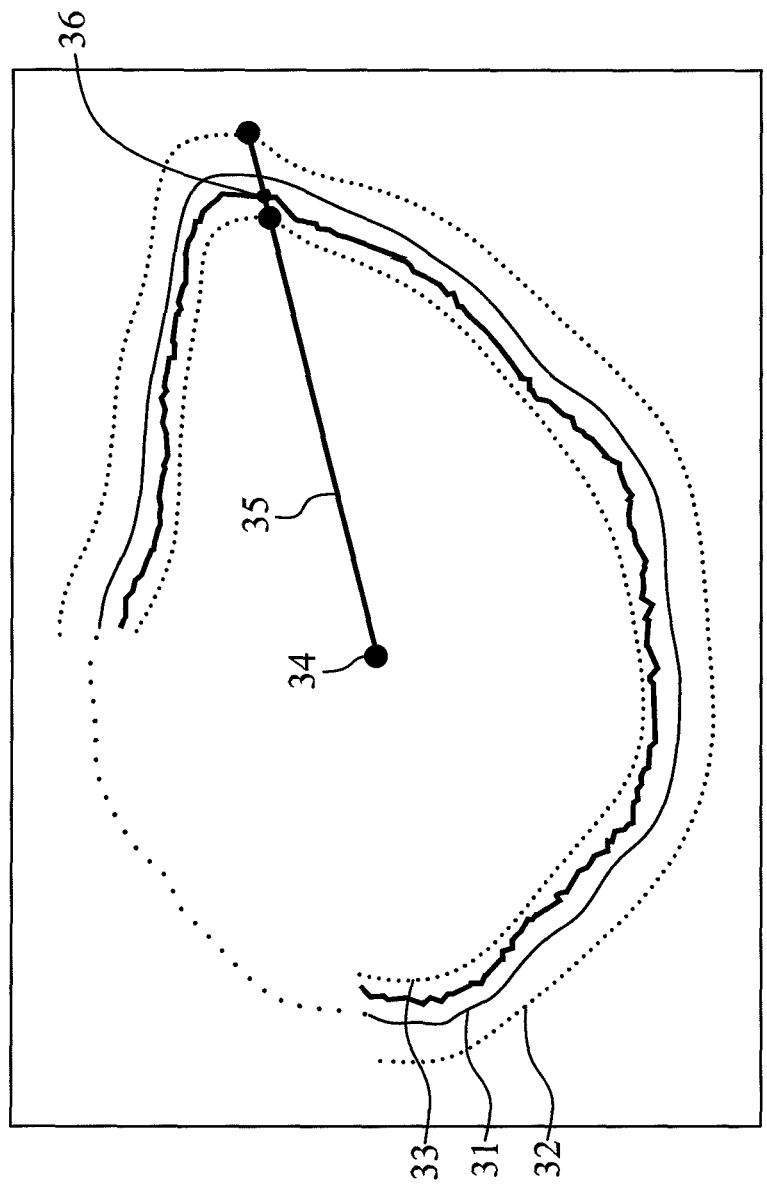
FIG. 3D is a gray scale image displaying a tumor, whose tumor contour and the tumor contour annular region is retrieved by the tumor contour retrieving method.

With reference to FIG. 3C and FIG. 3D, a tumor contour retrieving method for retrieving the tumor contour and the tumor contour annular region of step (A), the tumor contour and the tumor contour annular region retrieved from the gray scale image of step (A), and the definition of the center of gravity and the section line in the tumor inner region will be described below. FIG. 3C is the flowchart of a tumor contour retrieving method. FIG. 3D is a gray scale image displaying a tumor, whose tumor contour and the tumor contour annular region is retrieved by the tumor contour retrieving method.

As shown in FIG. 3C, in the present embodiment, a tumor contour retrieving method for retrieving the tumor contour and the tumor contour annular region of step (A) comprises the steps of:

inputting a preliminary tumor contour (the track 31 of FIG. 3D);

defining a preliminary tumor contour annular region (the region between the track 32 and the track 33 of FIG. 3D) based on the preliminary tumor contour, wherein the preliminary tumor contour is in the preliminary tumor contour annular region;

retrieving a preliminary center of gravity of the preliminary tumor contour annular region (the point 34 of FIG. 3D), defining a preliminary section line (the segment 35 of FIG. 3D) extending outwardly from the preliminary center of gravity and penetrating the preliminary tumor contour annular region, and providing a preliminary measured line segment being on the preliminary section line and in the preliminary tumor contour annular region;

calculating the moving variance of the gray scale of each of the plurality pixel pointson the preliminary measured line segment, based on the gradient value of the gray scale of each of the plurality pixel pointson the preliminary measured line segment;

comparing the moving variance of the gray scale of each of the plurality pixel pointson the preliminary measured line segment, and defining the pixel point having the maximum moving variance of the gray scale as a tumor contour suggestion point (the point 36 of FIG. 3D) on the preliminary section line; and changing the orientation of the preliminary section line to scan the whole margin of the tumor and connecting all the tumor contour suggestion point on different preliminary section lines, for retrieving the tumor contour and the tumor contour annular region.

After the tumor contour is retrieved from the gray scale image of FIG. 3D, the region enclosed by the tumor contour is defined as the tumor inner region. The region of the gray scale image of FIG. 3D not yet defined as the tumor inner region is defined as the tumor external region.

The calculation of the moving variance ($MV_{ijk}$) of the gray scale of each of the plurality pixel points on the preliminary measured line segment, based on the gradient value of the gray scale of each of the plurality pixel points on the preliminary measured line segment will be explained hereinafter, with reference to Table 1 below:

At first, the moving variance is defined as the ratio of the variance of the gray scale of a local segment for a certain pixel point over the mean variance of the gray scale of the plural moving horizon belong to the local segment, i.e.

$$MV_{ijk} = \frac{RL_{ijk}}{RM_{ijk}}$$

Wherein, the local segment includes the certain pixel point and plural pixel points before (or after) the certain pixel point, being on the preliminary measured line segment. In general, if p represents the number of pixel points before or after the certain pixel point, then the local segment includes 2p+1 pixel points therein.

Besides, the moving horizon of the local segment includes the certain pixel point and plural pixel points after the certain pixel point, being in the moving horizon. In general, if q represents the number of pixel points after the certain pixel point in the moving horizon, then the local segment includes 2p−q+2 moving variance therein.

TABLE 1

| k | 1 | 2 | 3 | 4 | 5 |
|---|---|---|---|---|---|
| $G_{ijk}$ | 77 | 79 | 78 | 79 | 94 |
| $MV_{ijk}$ | 4.996216 | 5.431265 | 5.72553 | 4.359829 | 5.065877 |
| k | 6 | 7 | 8 | 9 | 10 |
| $G_{ijk}$ | 93 | 93 | 88 | 78 | 64 |
| $MV_{ijk}$ | 8.586214 | 11.91848 | 13.55545 | 12.59645 | 17.43012 |
| k | 11 | 12 | 13 | 14 | 15 |
| $G_{ijk}$ | 50 | 52 | 56 | 65 | 62 |
| $MV_{ijk}$ | 14.88913 | 10.87886 | 6.907269 | 4.268695 | 4.830066 |
| k | 16 | 17 | 18 | 19 | |
| $G_{ijk}$ | 60 | 65 | 67 | 69 | |
| $MV_{ijk}$ | 11.60418 | 13.1099 | 7.002381 | 6.10648 | |

Wherein, k represents the serial number of the pixel points on the preliminary measured line segment. $G_{ijk}$ represents the gradient value of the gray scale of the pixel point. $MV_{ijk}$ represents the moving variance of the gray scale of the pixel point.

As shown in Table 1, the pixel point having the serial number 10 has the maximum moving variance of the gray scale. Thus, this pixel point on the preliminary measured line segment is the tumor contour suggestion point.

Figure 3E:
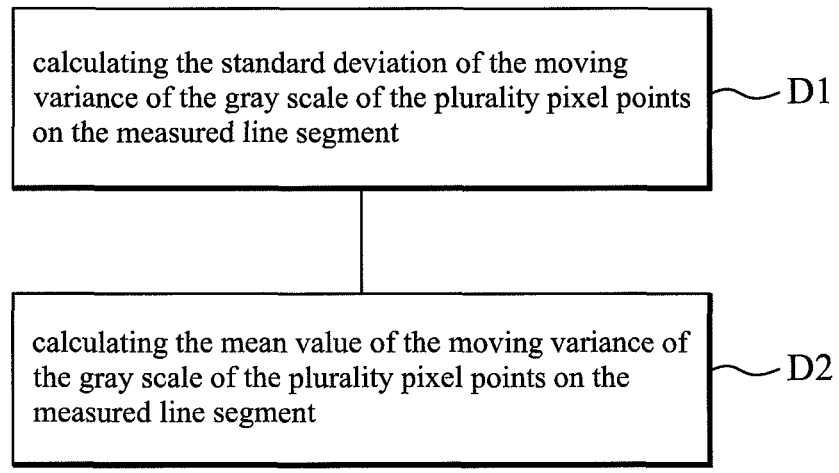
FIG. 3E is the flowchart displaying the substeps of step (D) of the quantification method of the margin feature of a tumor according to the first embodiment of the present invention.

Besides, as shown in FIG. 3E, the step (D) of the quantification method of the margin feature of a tumor of the present embodiment includes a step (D1), i.e. calculating the standard deviation of the moving variance of the gray scale ($_{std}MV_i$) of the plurality pixel points on the measured line segment, based on the moving variance of the gray scale ($MV_i$) of each of the plurality pixel points on the measured line segment. However, since the method of calculating the standard deviation of the moving variance of the gray scale ($_{std}MV_i$) from the moving variance of the gray scale ($MV_i$) is well-known in the art, the detailed steps of the method is omitted herein.

Moreover, as shown in FIG. 3E, the step (D) of the quantification method of the margin feature of a tumor of the present embodiment includes a step (D2) following the step (D1), i.e. calculating the mean value of the moving variance of the gray scale ($\overline{MV}_i$) of the plurality pixel points on the measured line segment, based on the moving variance of the gray scale ($MV_i$) of each of the plurality pixel points on the measured line segment. However, since the method of calculating the mean value of the moving variance of the gray scale ($\overline{MV}_i$) from the moving variance of the gray scale ($MV_i$) is well-known in the art, the detailed steps of the method is omitted herein.

Figure 3F:
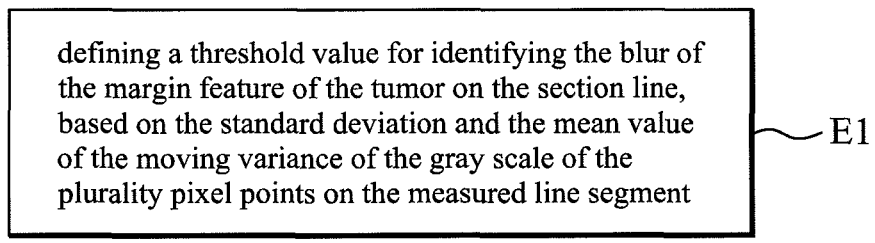
FIG. 3F is the flowchart displaying the substep of step (E) of the quantification method of the margin feature of a tumor according to the first embodiment of the present invention.

As shown in FIG. 3F, the step (E) of the quantification method of the margin feature of a tumor of the present embodiment includes a step (E1), i.e. defining a threshold value for identifying the blur of the margin feature of the tumor on the section line, based on the standard deviation ($_{std}MV_i$) and the mean value ($\overline{MV}_i$) of the moving variance of the gray scale of the plurality pixel points on the measured line segment.

In the present embodiment, the threshold value is the mean value of the moving variance of the gray scale ($\overline{MV}_i$) of the plurality pixel points on the measured line segment, plus 3 times of the standard deviation of the moving variance of the gray scale ($_{std}MV_i$) of the plurality pixel points on the measured line segment (i.e. $\overline{MV}_i + 3 \times {}_{std}MV_i$). If a pixel point on the measured line segment has a moving variance of the gray scale ($MV_i$) smaller than the threshold value, the pixel point is defined to have the blur margin feature. After examining all pixel points on the measured line segment, by dividing the number of pixel points being defined to have the blur margin feature with the number of entire pixel points on the measured line segment, the ratio of the blur margin feature on the measured line segment over the pixels points on the section line is obtained.

At final, the quantification method of the margin feature of a tumor of the present embodiment includes a step (F) following the step (E), i.e. changing the orientation of the section line to scan the whole margin of the tumor, for quantifying all the margin feature of the tumor. Therefore, the ratio of the blur margin feature over the whole margin of the tumor is obtained.

Figure 4A:
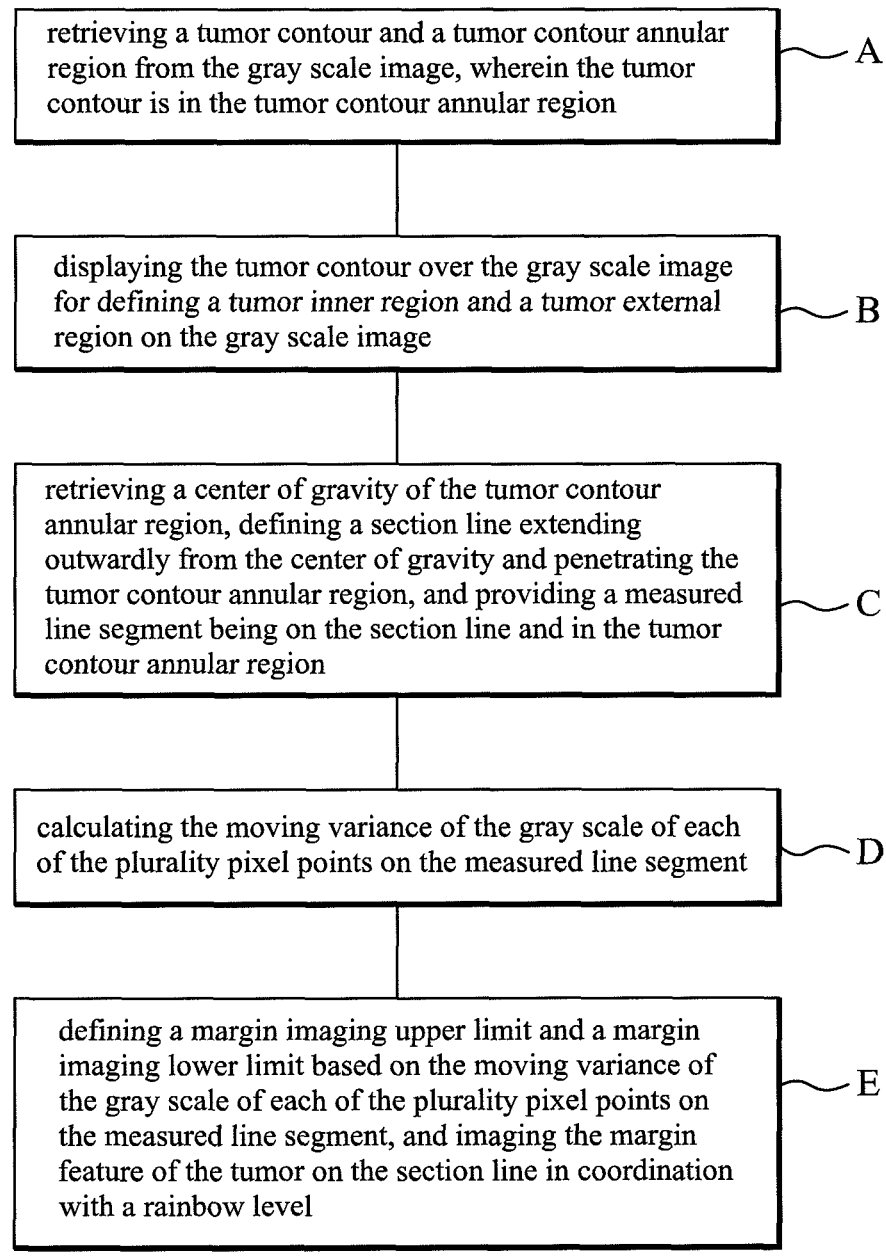
FIG. 4A is a flowchart of the imaging method of the margin feature of a tumor according to the second embodiment of the present invention.

As shown in FIG. 4A, which is a flowchart of the imaging method of the margin feature of a tumor according to the second embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) retrieving a center of gravity of the tumor contour annular region, defining a section line extending outwardly from the center of gravity and penetrating the tumor contour annular region, and providing a measured line segment being on the section line and in the tumor contour annular region;

(D) calculating the moving variance of the gray scale of each of the plurality pixel points on the measured line segment; and (E) defining a margin imaging upper limit and a margin imaging lower limit based on the moving variance of the gray scale of each of the plurality pixel points on the measured line segment, and imaging the margin feature of the tumor on the section line in coordination with a rainbow level.

However, since the tumor contour and the tumor contour annular region retrieved from the gray scale image of step (A), the tumor inner region and the tumor external region defined by the tumor contour of step (B), the center of gravity and the section line in the tumor inner region of step (C), and the calculating method of the moving variance of the gray scale of each of the plurality pixel points on the section line of step (D) have been described above, the detailed description of them is omitted herein.

Figure 4B:
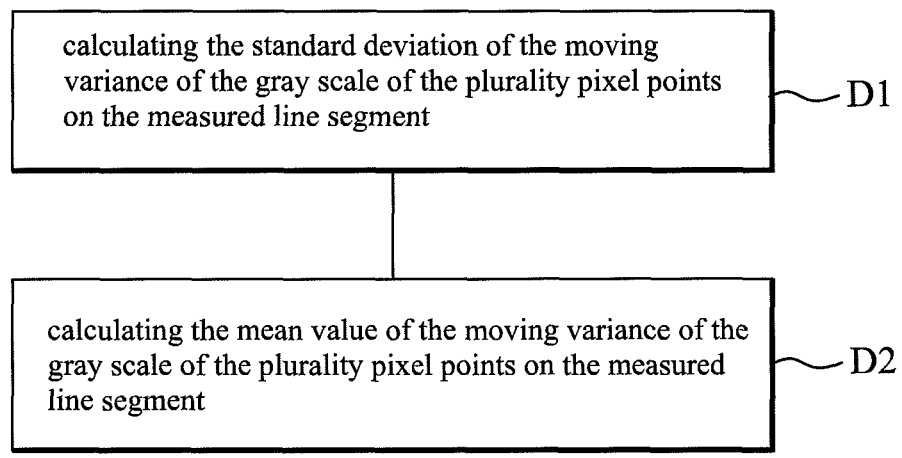
FIG. 4B is the flowchart displaying the substep of step (D) of the imaging method of the margin feature of a tumor according to the second embodiment of the present invention.

Besides, as shown in FIG. 4B, the step (D) of the imaging method of the margin feature of a tumor of the present embodiment includes a step (D1), i.e. calculating the standard deviation of the moving variance of the gray scale ($_{std}MV_i$) of the plurality pixel points on the measured line segment. However, since the method of calculating the standard deviation of the moving variance of the gray scale ($_{std}MV_i$) from the moving variance of the gray scale ($MV_i$) is well-known in the art, the detailed steps of the method is omitted herein.

Moreover, as shown in FIG. 4B, the step (D) of the imaging method of the margin feature of a tumor of the present embodiment includes a step (D2) following the step (D1), i.e. calculating the mean value of the moving variance of the gray scale ($\overline{MV_i}$) of the plurality pixel points on the measured line segment. However, since the method of calculating the mean value of the moving variance of the gray scale ($\overline{MV_i}$) from the moving variance of the gray scale ($MV_i$) is well-known in the art, the detailed steps of the method is omitted herein.

Figure 4C:
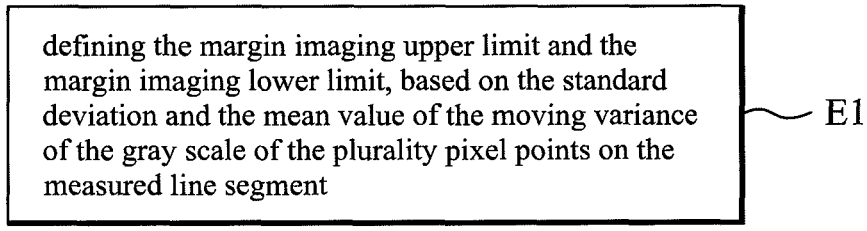
FIG. 4C is the flowchart displaying the substep of step (E) of the imaging method of the margin feature of a tumor according to the second embodiment of the present invention.

As shown in FIG. 4C, the step (E) of the imaging method of the margin feature of a tumor of the present embodiment includes a step (E1), i.e. defining the margin imaging upper limit and the margin imaging lower limit, based on the standard deviation ($_{std}MV_i$) and the mean value ($\overline{MV_i}$) of the moving variance of the gray scale of the plurality pixel points on the measured line segment.

In the present embodiment, the margin imaging upper limit is the mean value of the moving variance of the gray scale of the plurality pixel points on the measured line segment, plus 3 times of the standard deviation of the moving variance of the gray scale of the plurality pixel points on the measured line segment (i.e. $\overline{MV_i}+3\times_{std}MV_i$). The margin imaging lower limit is the mean value of the moving variance of the gray scale of the plurality pixel points on the measured line segment, minus 3 times of the standard deviation of the moving variance of the gray scale of the plurality pixel points on the measured line segment (i.e. $\overline{MV_i}\times3_{std}MV_i$). However, if the margin imaging lower limit is smaller than the minimum value of the moving variance of the gray scale of the plurality pixel points on the measured line segment, then the margin imaging lower limit is adjusted to be equal to the minimum value of the moving variance of the gray scale of the plurality pixel points on the measured line segment.

It should be noticed that, in other application case, the margin imaging upper limit and the margin imaging lower limit could have other value, respectively. For example, the margin imaging upper limit could be the mean value of the moving variance of the gray scale of the plurality pixel points on the measured line segment, plus 2 times of the standard deviation of the moving variance of the gray scale of the plurality pixel points on the measured line segment (i.e. $\overline{MV_i}+2\times_{std}MV_i$). The margin imaging lower limit could be the mean value of the moving variance of the gray scale of the plurality pixel points on the measured line segment, minus 2 times of the standard deviation of the moving variance of the gray scale of the plurality pixel points on the measured line segment (i.e. $\overline{MV_i}-2\times_{std}MV_i$). The only requirement is that the margin imaging upper limit must be larger than the margin imaging lower limit.

Figure 5:
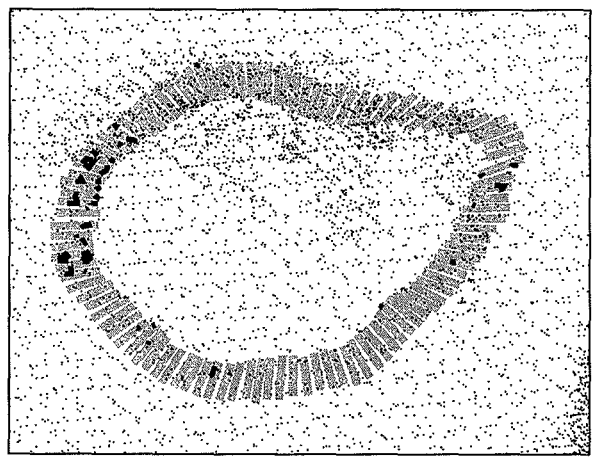
FIG. 5 displays a image pattern displaying the margin feature of a tumor.

Besides, the rainbow level used in step (E) of the imaging method of the margin feature of a tumor of the present embodiment is a level changing continuously from red to purple, through orange, yellow, green, blue, and indigo, as shown on right side edge of FIG. 5. While the margin feature of the tumor is imaged, all pixels points on the measured line segment are imaged according to the imaging rules below:

1. If a pixel point on the measured line segment having the moving variance of the gray scale larger than or equal to the margin imaging upper limit, the pixel point is covered by a red block;
2. If a pixel point on the measured line segment having the moving variance of the gray scale smaller than or equal to the margin imaging lower limit, the pixel point is covered by a purple block1; and
3. If a pixel point on the measured line segment having the moving variance of the gray scale between the margin imaging upper limit and the margin imaging lower limit, the pixel point is covered by a block having the color selected from the rainbow level corresponding to the relation among the moving variance of the gray scale of the pixel point, the margin imaging upper limit and the margin imaging lower limit.

After all pixels points on the measured line segment are imaged according to the imaging rules above, i.e. after the step (E) is completed, the imaging method of the margin feature of a tumor of the present embodiment can further comprises a step (F), changing the orientation of the section line to scan the whole margin of the tumor, for imaging all the margin feature of the tumor. Therefore, all pixel points in the tumor contour annular region of the tumor are imaged, and an image pattern having the margin feature imaged is obtained, as shown in FIG. 5. With the assistance of the image pattern of FIG. 5, a doctor can easily discover the distribution of the margin feature of the tumor and the blur index of the margin feature of the tumor.

It should be noticed that the color blocks of the imaging pattern of FIG. 7 can not only displays on the ultrasonic gray scale image continuously, it can also displays on the ultrasonic gray scale image periodically. Thus, the doctor can observe other features of the tumor while the margin feature is imaged.

Figure 6A:
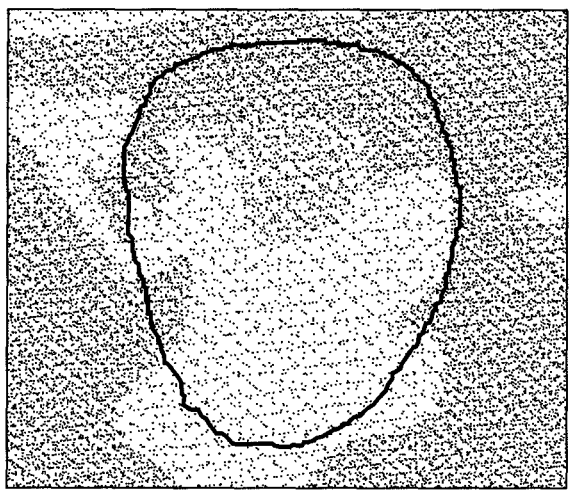
FIG. 6A is an ultrasonic gray scale image.

FIG. 6A displays an ultrasonic gray scale image consisting of a plurality of pixel points, wherein each of the plurality of pixel points has a gradient value of the gray scale. Besides, the ultrasonic gray scale image of FIG. 6A displays a thyroid tumor and the surrounding thyroid tissue, wherein the thyroid tumor includes a cysts region therein.

Figure 6B:
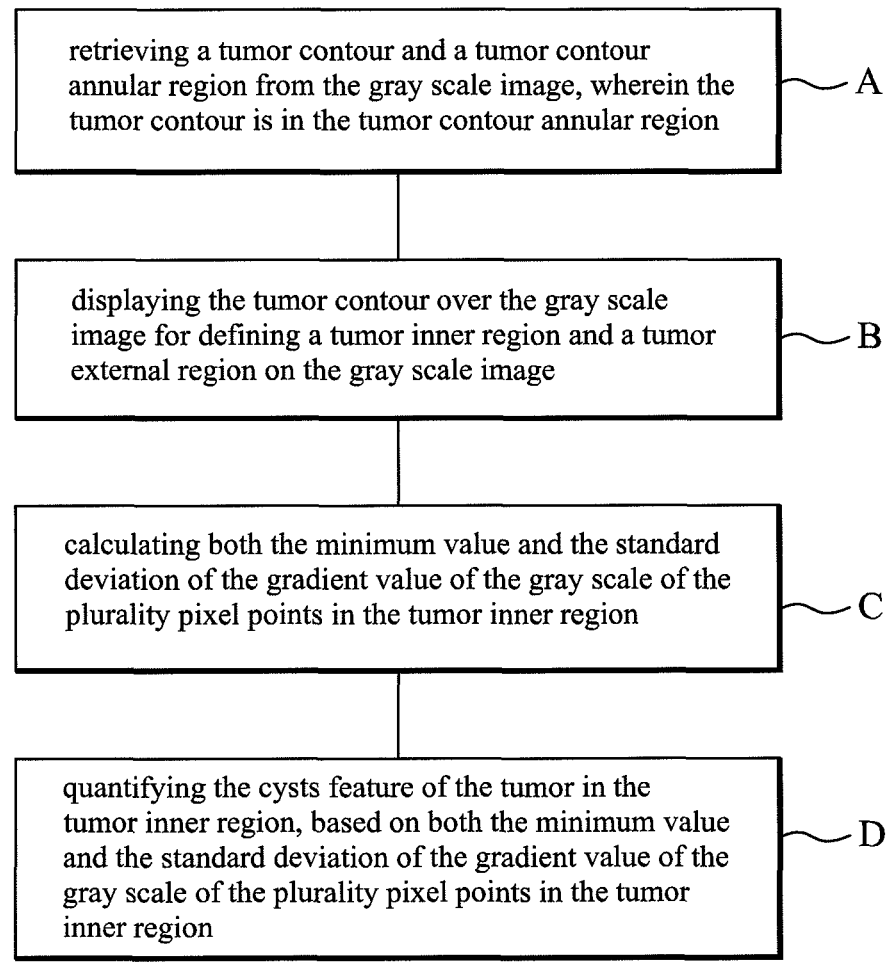
FIG. 6B is a flowchart of the quantification method of the cysts feature of a tumor according to the third embodiment of the present invention.

As shown in FIG. 6B, which is a flowchart of the quantification method of the cysts feature of a tumor according to the third embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) calculating both the minimum value and the standard deviation of the gradient value of the gray scale of the plurality pixel points in the tumor inner region; and (D) quantifying the cysts feature of the tumor in the tumor inner region, based on both the minimum value and the standard deviation of the gradient value of the gray scale of the plurality pixel points in the tumor inner region.

However, since the tumor contour and the tumor contour annular region retrieved from the gray scale image of step (A), and the tumor inner region and the tumor external region defined by the tumor contour of step (B), have been described above, the detailed description of them is omitted herein.

Moreover, since the calculating method of the minimum value and the standard deviation of the gradient value of the gray scale of the plurality pixel points in the tumor inner region of step (C) is well-known in the art, the detailed steps of the method is omitted herein.

As shown in FIG. 6C, the step (D) of the quantification method of the cysts feature of a tumor of the present embodiment includes a step (D1), i.e. defining a threshold value for calculating the ratio of the region having the cysts feature over the tumor inner region, based on both the minimum value ($_{min}G_{ijl}$) and the standard deviation ($_{std}G_{ijl}$) of the gradient value of the gray scale of the plurality pixel points in the tumor inner region.

In the present embodiment, the threshold value is the minimum value ($_{min}G_{ijl}$) of the gradient value of the gray scale of the plurality pixel points in the tumor inner region, plus 0.1 times of the standard deviation ($_{std}G_{ijl}$) of the gradient value of the gray scale of the plurality pixel points in the tumor inner region (i.e. $_{min}G_{ijl}+0.1\times_{std}G_{ijl}$). If a pixel point in the tumor inner region has a gradient value of the gray scale ($G_{ijl}$) smaller than the threshold value, the pixel point is defined to have the cysts feature. After examining all pixel points in the tumor inner region, by dividing the number of pixel points being defined to have the cysts feature with the number of entire pixel points in the tumor inner region, the ratio of the cysts feature in the tumor inner region is obtained.

Figure 7A:
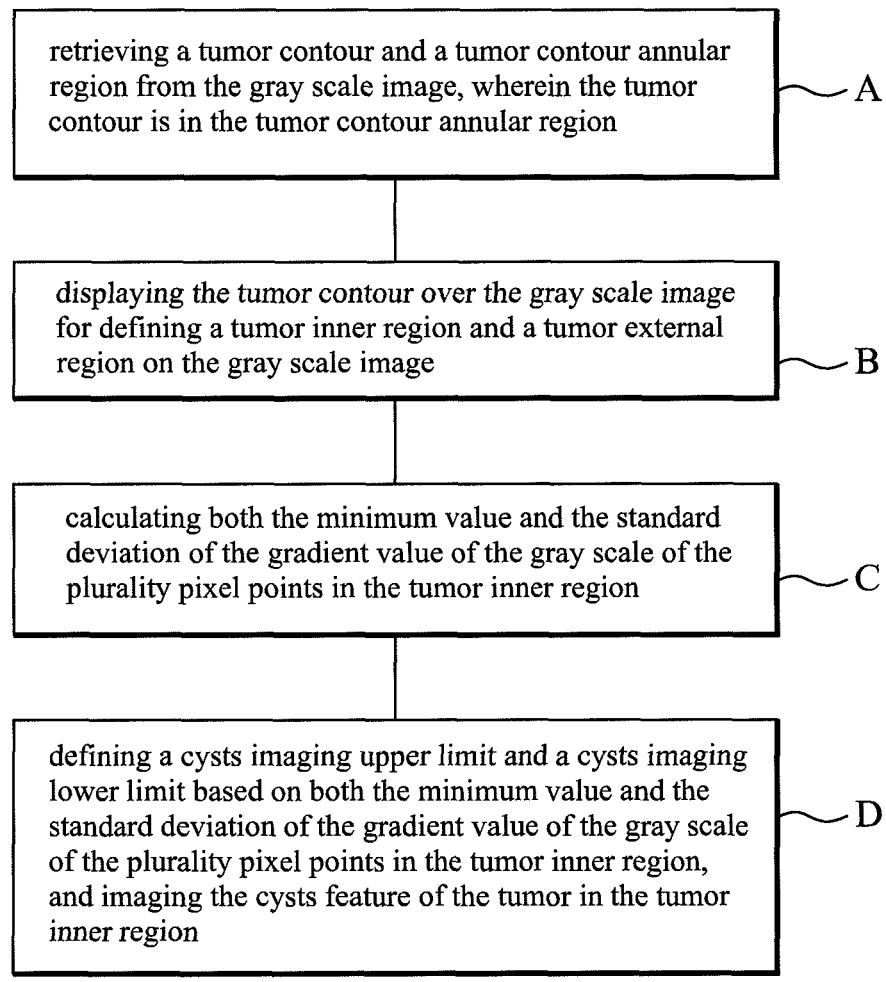
FIG. 7A is a flowchart of the imaging method of the cysts feature of a tumor according to the fourth embodiment of the present invention.

As shown in FIG. 7A, which is a flowchart of the imaging method of the cysts feature of a tumor according to the fourth embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) calculating both the minimum value and the standard deviation of the gradient value of the gray scale of the plurality pixel points in the tumor inner region; and (D) defining a cysts imaging upper limit and a cysts imaging lower limit based on both the minimum value and the standard deviation of the gradient value of the gray scale of the plurality pixel points in the tumor inner region, and imaging the cysts feature of the tumor in the tumor inner region.

However, since the tumor contour and the tumor contour annular region retrieved from the gray scale image of step (A), and the tumor inner region and the tumor external region defined by the tumor contour of step (B) have been described above, the detailed description of them is omitted herein.

Moreover, since the calculating method of the minimum value and the standard deviation of the gradient value of the gray scale of the plurality pixel points in the tumor inner region of step (C) is well-known in the art, the detailed steps of the method is omitted herein.

Besides, the cysts imaging upper limit defined in step (D) of the imaging method of the cysts feature of a tumor of the present embodiment is the minimum value ($_{min}G_{ijl}$) of the gradient value of the gray scale of the plurality pixel points in the tumor inner region, plus 0.1 times of the standard deviation ($_{std}G_{ijl}$) of the gradient value of the gray scale of the plurality pixel points in the tumor inner region (i.e. $_{min}G_{ijl}+0.1\times_{std}G_{ijl}$). The cysts imaging lower limit is the minimum value ($_{min}G_{ijl}$) of the gradient value of the gray scale of the plurality pixel points in the tumor inner region.

It should be noticed that, in other application case, the cysts imaging upper limit and the cysts imaging lower limit could have other value, respectively. For example, the cysts imaging upper limit could be the minimum value ($_{min}G_{ijl}$) of the gradient value of the gray scale of the plurality pixel points in the tumor inner region, plus 0.3 times of the standard deviation ($_{std}G_{ijl}$) of the gradient value of the gray scale of the plurality pixel points in the tumor inner region (i.e. $_{min}G_{ijl}+0.3\times_{std}G_{ijl}$). The cysts imaging lower limit could be the minimum value ($_{min}G_{ijl}$) of the gradient value of the gray scale of the plurality pixel points in the tumor inner region, plus 0.05 times of the standard deviation ($_{std}G_{ijl}$) of the gradient value of the gray scale of the plurality pixel points in the tumor inner region (i.e. $_{min}G_{ijl}+0.05\times_{std}G_{ijl}$). The only requirement is that the cysts imaging upper limit must be larger than the cysts imaging lower limit.

Figure 7B:
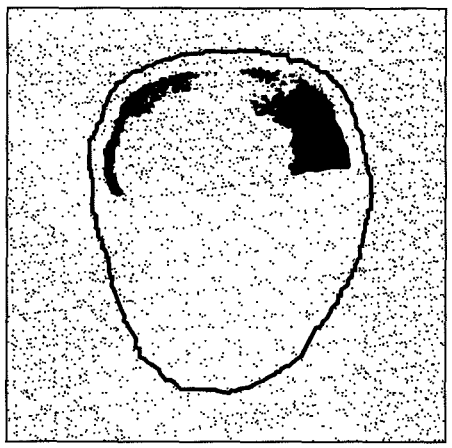
FIG. 7B displays a image pattern displaying the cysts feature of a tumor.

Besides, while the cysts feature of the tumor is imaged, if a pixel point having the gradient value of the gray scale between the cysts imaging upper limit and the cysts imaging lower limit, the pixel point is covered by a peach block. After all the pixel points in the tumor inner region being imaged according to the imaging rules above, an image pattern having the cysts feature imaged is obtained, as shown in FIG. 7B. With the assistance of the image pattern of FIG. 7B, a doctor can easily discover the distribution of the cysts feature of the tumor and the ratio of the cysts feature over the tumor inner region.

Moreover, the imaging method of the cysts feature of a tumor according to the fourth embodiment of the present invention can further comprise the below steps, following the step (D), such as:

(E) defining a plurality of reference masks from the plurality pixel points in the tumor inner region, each of the plurality of reference masks including a reference pixel point and plural pixels points adjacent to the reference pixel point, wherein the gradient value of the gray scale of the reference pixel point is between the cysts imaging upper limit and the cysts imaging lower limit; and (F) covering the reference pixel point and all the plural pixels points with a peach block while the gradient value of the gray scale of at least one of the plural pixels points is between the cysts imaging upper limit and the cysts imaging lower limit and the cysts feature of the tumor is imaged.

On the other hand, the imaging method of the cysts feature of a tumor according to the fourth embodiment of the present invention can further comprise step (G) following the step (F):

(G) removing the peack block covering the reference pixel point and all the plural pixels points while only the gradient value of the gray scale of the reference pixel point is between the cysts imaging upper limit and the cysts imaging lower limit and the cysts feature of the tumor is imaged.

By completing the steps (E) to (G) described above, the shape and the area of the peach block is more coincident with the actual shape and the area of the cysts feature of the tumor. Besides, in the present embodiment, the reference mask defined in step (E) includes 9 pixel points.

Figure 8A:
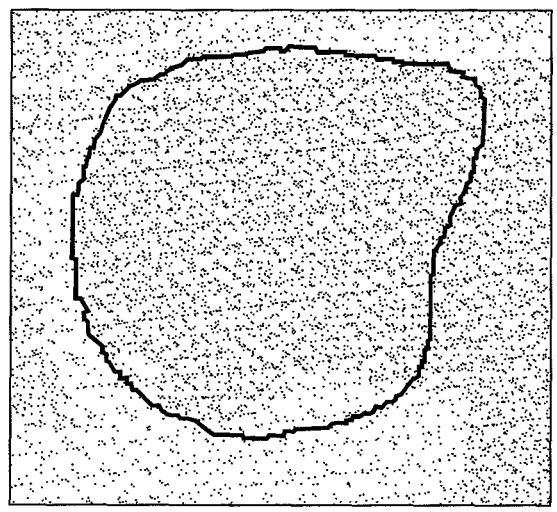
FIG. 8A is an ultrasonic gray scale image.

FIG. 8A displays an ultrasonic gray scale image consisting of a plurality of pixel points, wherein each of the plurality of pixel points has a gradient value of the gray scale. Besides, the ultrasonic gray scale image of FIG. 8A displays a thyroid tumor and the surrounding thyroid tissue, wherein the thyroid tumor includes a calcifications region therein.

Figure 8B:
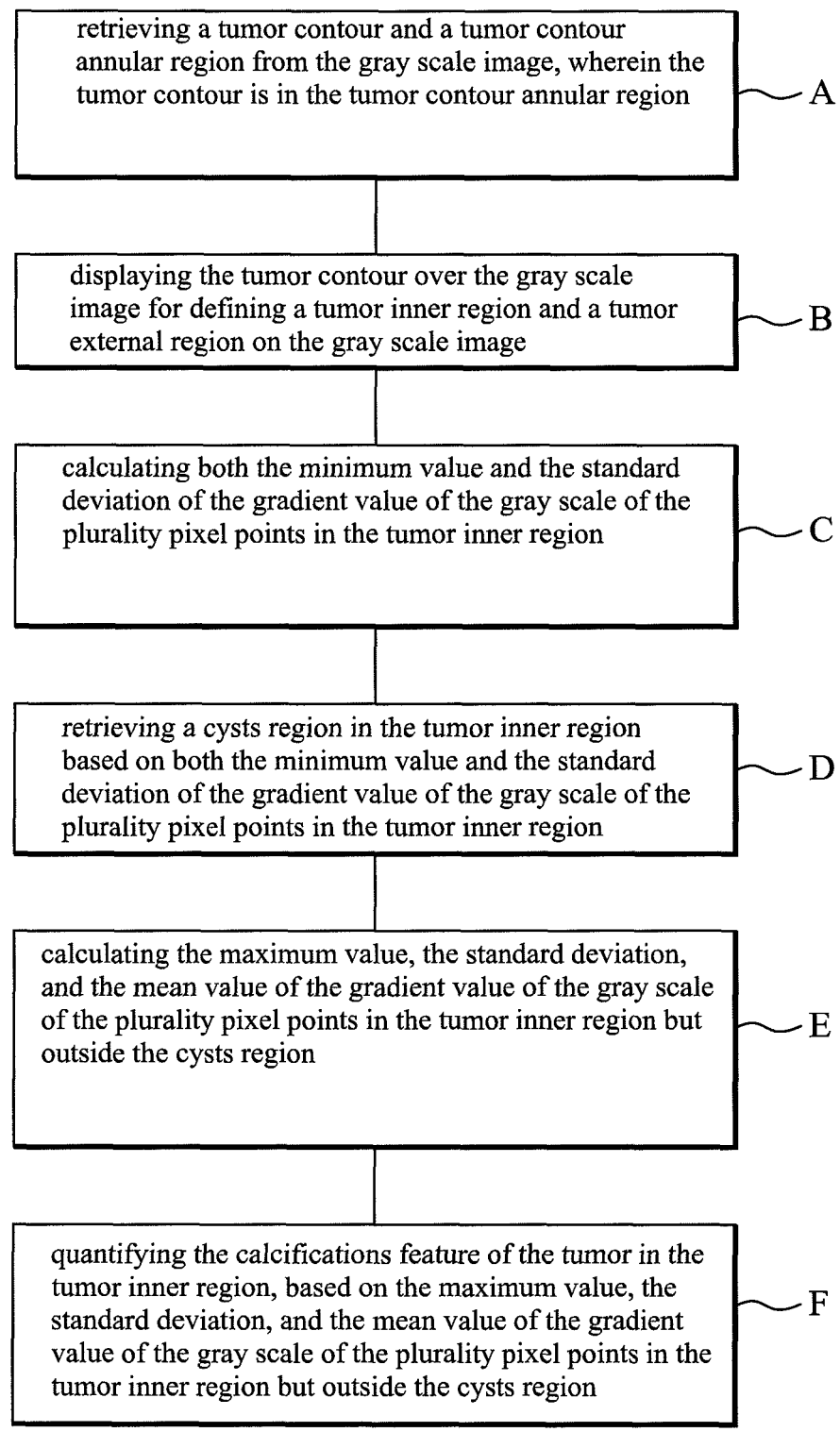
FIG. 8B is a flowchart of the quantification method of the calcifications feature of a tumor according to the fifth embodiment of the present invention.

As shown in FIG. 8B, which is a flowchart of the quantification method of the calcifications feature of a tumor according to the fifth embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) calculating both the minimum value and the standard deviation of the gradient value of the gray scale of the plurality pixel points in the tumor inner region;

(D) retrieving a cysts region in the tumor inner region based on both the minimum value and the standard deviation of the gradient value of the gray scale of the plurality pixel points in the tumor inner region;

(E) calculating the maximum value, the standard deviation, and the mean value of the gradient value of the gray scale of the plurality pixel points in the tumor inner region but outside the cysts region; and (F) quantifying the calcifications feature of the tumor in the tumor inner region, based on the maximum value, the standard deviation, and the mean value of the gradient value of the gray scale of the plurality pixel points in the tumor inner region but outside the cysts region.

However, since the tumor contour and the tumor contour annular region retrieved from the gray scale image of step (A), the tumor inner region and the tumor external region defined by the tumor contour of step (B) and the cysts region retrieved in step (D) have been described above, the detailed description of them is omitted herein.

Moreover, since the calculating method of the minimum value and the standard deviation of the gradient value of the gray scale of the plurality pixel points in the tumor inner region of step (C) and the calculating method of the maximum value, the standard deviation, and the mean value of the gradient value of the gray scale of the plurality pixel points in the tumor inner region but outside the cysts region of step (E) is well-known in the art, the detailed steps of the methods are omitted herein.

As shown in FIG. 8C, the step (F) of the quantification method of the calcifications feature of a tumor of the present embodiment includes a step (F1), i.e. defining a threshold value for calculating the ratio of the region having the calcifications feature over the tumor inner region, based on the maximum value ($_{max\_c}G_{ijl}$), the standard deviation ($_{std\_c}G_{ijl}$), and the mean value ($_{mean\_c}G_{ijl}$) of (the gradient value of the gray scale of the plurality pixel points in the tumor inner region but outside the cysts region.

In the present embodiment, the threshold value is the mean value ($_{mean\_c}G_{ijl}$) of the gradient value of the gray scale of the plurality pixel points in the tumor inner region but outside the cysts region, plus 2.8 times of the standard deviation ($_{std\_c}G_{ijl}$) of the gradient value of the gray scale of the plurality pixel points in the tumor inner region but outside the cysts region (i.e. $_{mean\_c}G_{ijl}+2.8\times_{std\_c}G_{ijl}$). If a pixel point in the tumor inner region but outside the cysts region has a gradient value of the gray scale ($G_{ijl}$) larger than the threshold value, the pixel point is defined to have the calcifications feature. After examining all pixel points in the tumor inner region, by dividing the number of pixel points being defined to have the calcifications feature with the number of entire pixel points in the tumor inner region, the ratio of the calcifications feature in the tumor inner region is obtained.

Figure 9A:
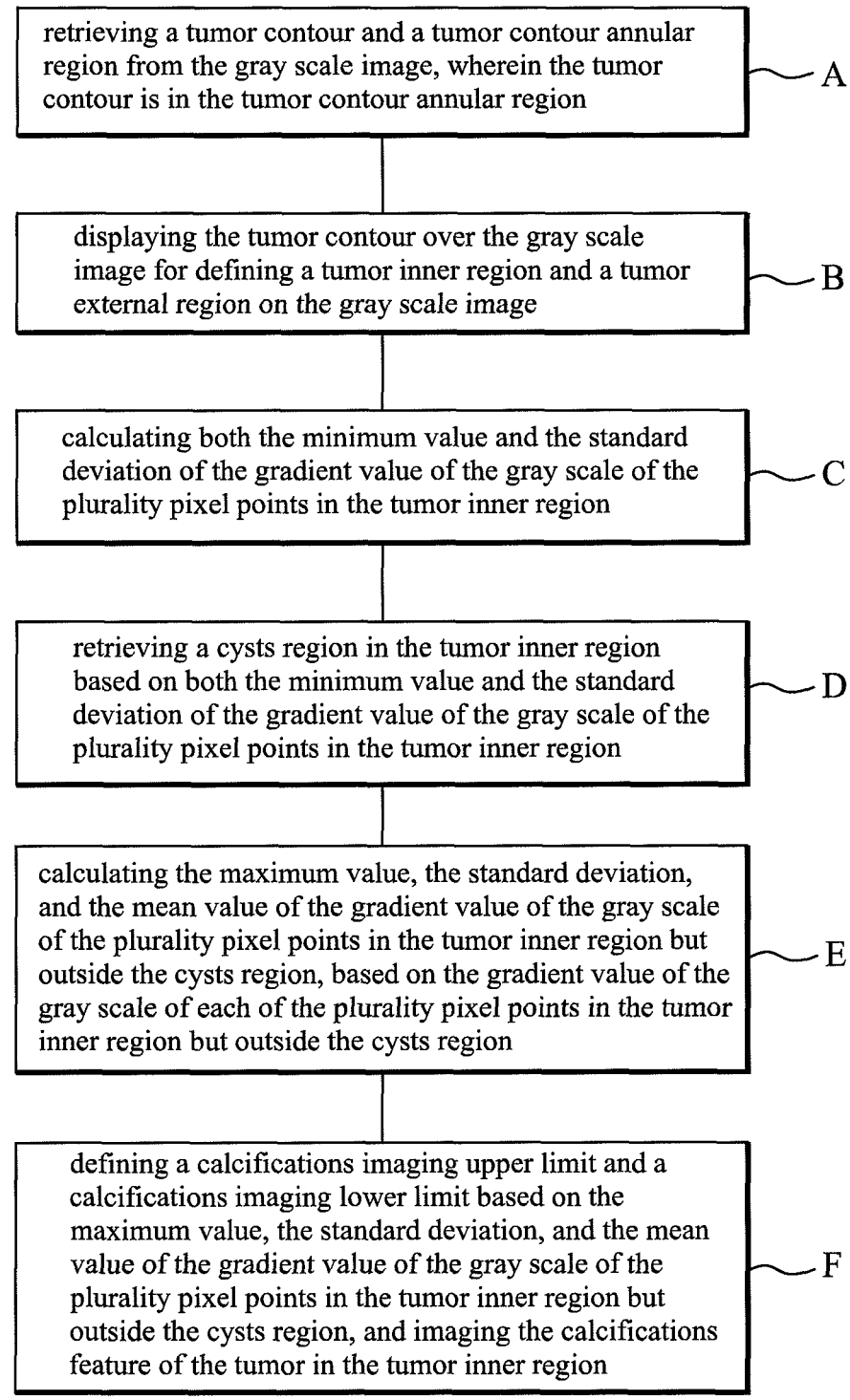
FIG. 9A is a flowchart of the imaging method of the calcifications feature of a tumor according to the sixth embodiment of the present invention.

As shown in FIG. 9A, which is a flowchart of the imaging method of the calcifications feature of a tumor according to the sixth embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) calculating both the minimum value and the standard deviation of the gradient value of the gray scale of the plurality pixel points in the tumor inner region;

(D) retrieving a cysts region in the tumor inner region based on both the minimum value and the standard deviation of the gradient value of the gray scale of the plurality pixel points in the tumor inner region;

(E) calculating the maximum value, the standard deviation, and the mean value of the gradient value of the gray scale of the plurality pixel points in the tumor inner region but outside the cysts region, based on the gradient value of the gray scale of each of the plurality pixel points in the tumor inner region but outside the cysts region; and (F) defining a calcifications imaging upper limit and a calcifications imaging lower limit based on the maximum value, the standard deviation, and the mean value of the gradient value of the gray scale of the plurality pixel points in the tumor inner region but outside the cysts region, and imaging the calcifications feature of the tumor in the tumor inner region.

However, since the tumor contour and the tumor contour annular region retrieved from the gray scale image of step (A), the tumor inner region and the tumor external region defined by the tumor contour of step (B) and the cysts region retrieved in step (D) have been described above, the detailed description of them is omitted herein.

Moreover, since the calculating method of the minimum value and the standard deviation of the gradient value of the gray scale of the plurality pixel points in the tumor inner region of step (C) and the calculating method of the maximum value, the standard deviation, and the mean value of the gradient value of the gray scale of the plurality pixel points in the tumor inner region but outside the cysts region of step (E) is well-known in the art, the detailed steps of the methods are omitted herein.

Besides, the calcifications imaging upper limit defined in step (F) of the imaging method of the calcifications feature of a tumor of the present embodiment is the maximum value ($_{max\_c}G_{ijl}$) of the gradient value of the gray scale of the plurality pixel points in the tumor inner region but outside the cysts region. The calcifications imaging lower limit is the mean value ($_{mean\_c}G_{ijl}$) of the gradient value of the gray scale of the plurality pixel points in the tumor inner region but outside the cysts region, plus 2.8 times of the standard deviation ($_{std\_c}G_{ijl}$) of the gradient value of the gray scale of the plurality pixel points in the tumor inner region but outside the cysts region (i.e. $_{mean\_c}G_{ijl}+2.8\times_{std\_c}G_{ijl}$).

It should be noticed that, in other application case, the calcifications imaging upper limit and the calcifications imaging lower limit could have other value, respectively. For example, the calcifications imaging upper limit could be the maximum value ($_{max\_c}G_{ijl}$) of the gradient value of the gray scale of the plurality pixel points in the tumor inner region but outside the cysts region, minus 0.1 times of the standard deviation ($_{std\_c}G_{ijl}$) of the gradient value of the gray scale of the plurality pixel points in the tumor inner region but outside the cysts region (i.e. $_{max\_c}G_{ijl}-0.1\times_{std\_c}G_{ijl}$). The calcifications imaging lower limit could be the mean value ($_{mean\_c}G_{ijl}$) of the gradient value of the gray scale of the plurality pixel points in the tumor inner region but outside the cysts region, plus 2.5 times of the standard deviation ($_{std\_c}G_{ijl}$) of the gradient value of the gray scale of the plurality pixel points in the tumor inner region but outside the cysts region (i.e. $_{mean\_c}G_{ijl}+2.5\times_{std\_c}G_{ijl}$). The only requirement is that the calcifications imaging upper limit must be larger than the calcifications imaging lower limit.

Figure 9B:
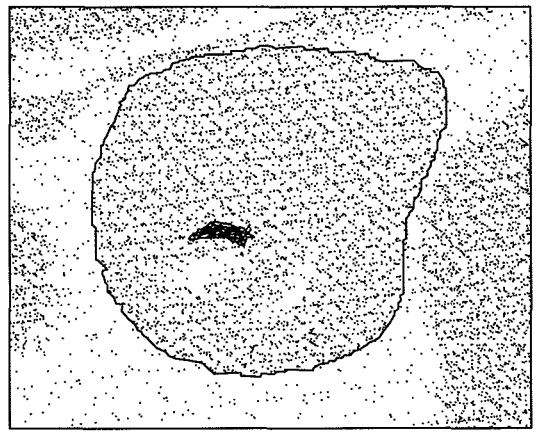
FIG. 9B displays a image pattern displaying the calcifications feature of a tumor.

Besides, while the calcifications feature of the tumor is imaged, if a pixel point in the tumor inner region but outside the cysts region having the gradient value of the gray scale between the calcifications imaging upper limit and the calcifications imaging lower limit, the pixel point is covered by a yellow block. After all the pixel points in the tumor inner region but outside the cysts region being imaged according to the imaging rules above, an image pattern having the calcifications feature imaged is obtained, as shown in FIG. 9B. With the assistance of the image pattern of FIG. 9B, a doctor can easily discover the distribution of the calcifications feature of the tumor and the ratio of the calcifications feature over the tumor inner region.

Figure 10A:
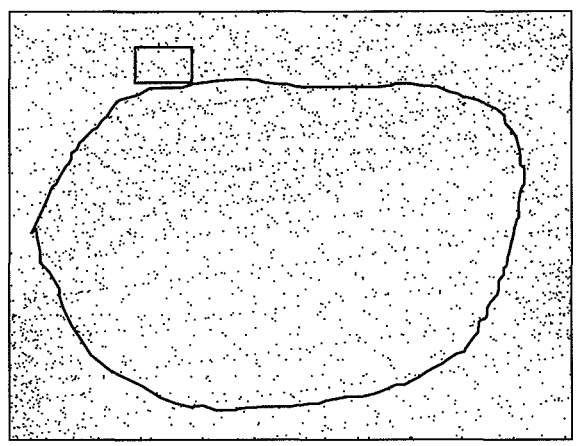
FIG. 10A is an ultrasonic gray scale image.

FIG. 10A displays an ultrasonic gray scale image consisting of a plurality of pixel points, wherein each of the plurality of pixel points has a gradient value of the gray scale. Besides, the ultrasonic gray scale image of FIG. 10A displays a thyroid tumor and the surrounding thyroid tissue.

Figure 10B:
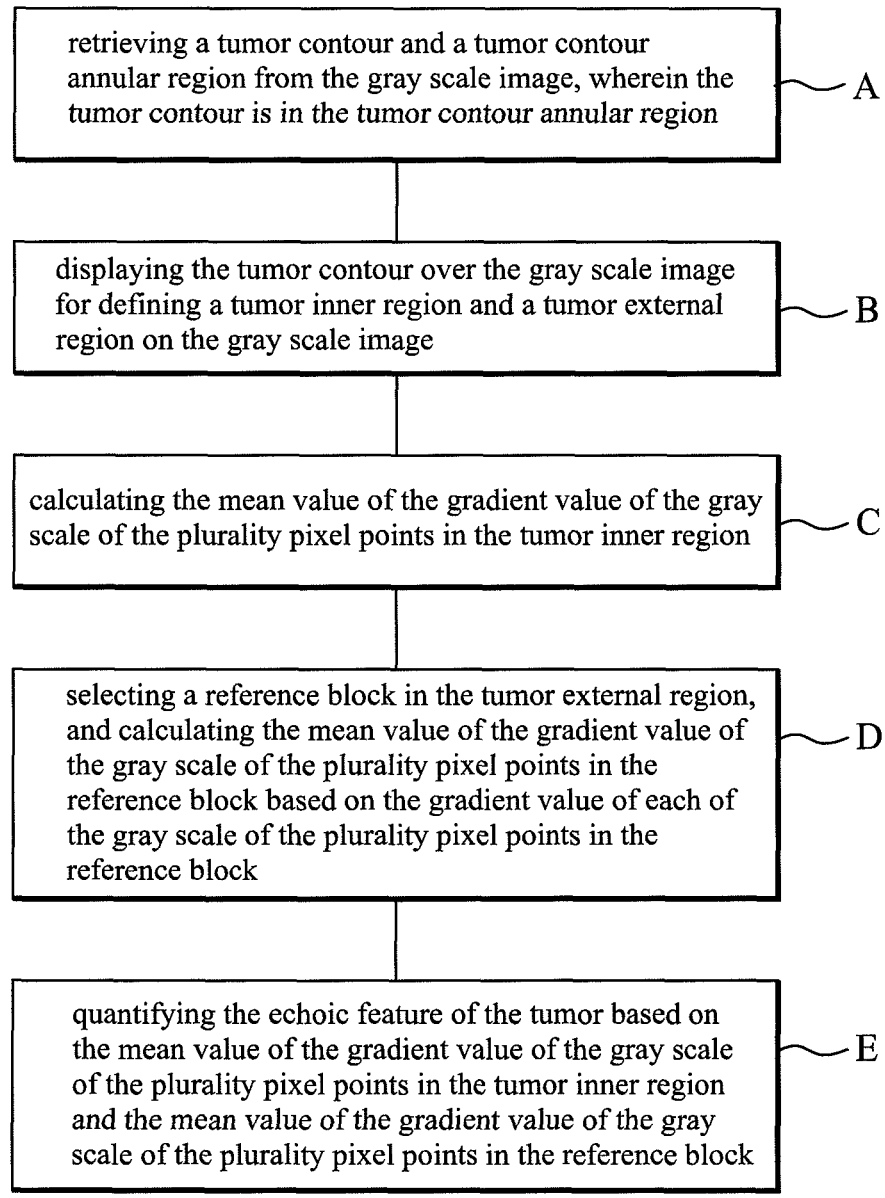
FIG. 10B is a flowchart of the quantification method of the echoic feature of a tumor according to the seventh embodiment of the present invention.

As shown in FIG. 10B, which is a flowchart of the quantification method of the echoic feature of a tumor according to the seventh embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) calculating the mean value of the gradient value of the gray scale of the plurality pixel points in the tumor inner region;

(D) selecting a reference block in the tumor external region, and calculating the mean value of the gradient value of the gray scale of the plurality pixel points in the reference block based on the gradient value of each of the gray scale of the plurality pixel points in the reference block; and (E) quantifying the echoic feature of the tumor based on the mean value of the gradient value of the gray scale of the plurality pixel points in the tumor inner region and the mean value of the gradient value of the gray scale of the plurality pixel points in the reference block.

However, since the tumor contour and the tumor contour annular region retrieved from the gray scale image of step (A) and the tumor inner region and the tumor external region defined by the tumor contour of step (B) have been described above, the detailed description of them is omitted herein.

Moreover, since the calculating method of the mean value of the gradient value of the gray scale of the plurality pixel points in the tumor inner region of step (C) and the calculating method of the mean value of the gradient value of the gray scale of the plurality pixel points in the reference block of step (D) is well-known in the art, the detailed steps of the methods are omitted herein.

Besides, the aforementioned reference block is the region enclosed by the rectangular frame outside the tumor contour of FIG. 10A, i.e. in the tumor external region. In general, the reference block is located at the region of the ultrasonic gray scale image displaying the ordinary tissue.

In the present embodiment, the echoic feature of the tumor is quantified by dividing the difference between the mean value ($_{mean}G_{ijl}$) of the gradient value of the gray scale of the plurality pixel points in the tumor inner region and the mean value ($_{mean}G_r$) of the gradient value of the gray scale of the plurality pixel points in the reference block with the mean value ($_{mean}G_r$) of the gradient value of the gray scale of the plurality pixel points in the reference block, as shown in the following formula:

$$ER = \frac{_{mean}G_{ijl} - _{mean}G_r}{_{mean}G_r} \times 100\%$$

Figure 11A:
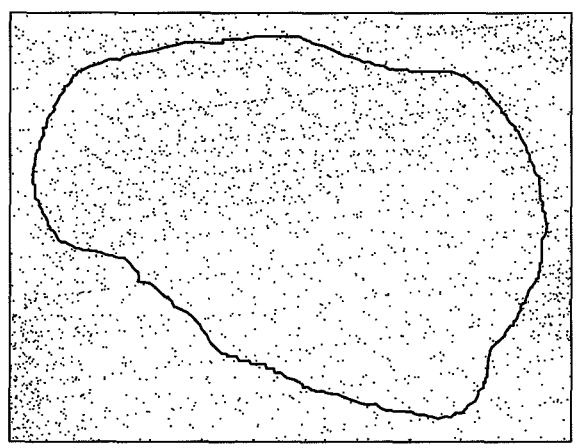
FIG. 11A is an ultrasonic gray scale image.

In general, the result of the above formula is represented by ER. If ER is larger than or equal to 0 (i.e. ER≥0), the tumor is defined to have the hyperechoic feature. If ER is smaller than 0 (i.e. ER<0), the tumor is defined to have the hypoechoic feature FIG. 11A displays an ultrasonic gray scale image consisting of a plurality of pixel points, wherein each of the plurality of pixel points has a gradient value of the gray scale. Besides, the ultrasonic gray scale image of FIG. 11A displays a thyroid tumor and the surrounding thyroid tissue.

Figure 11B:
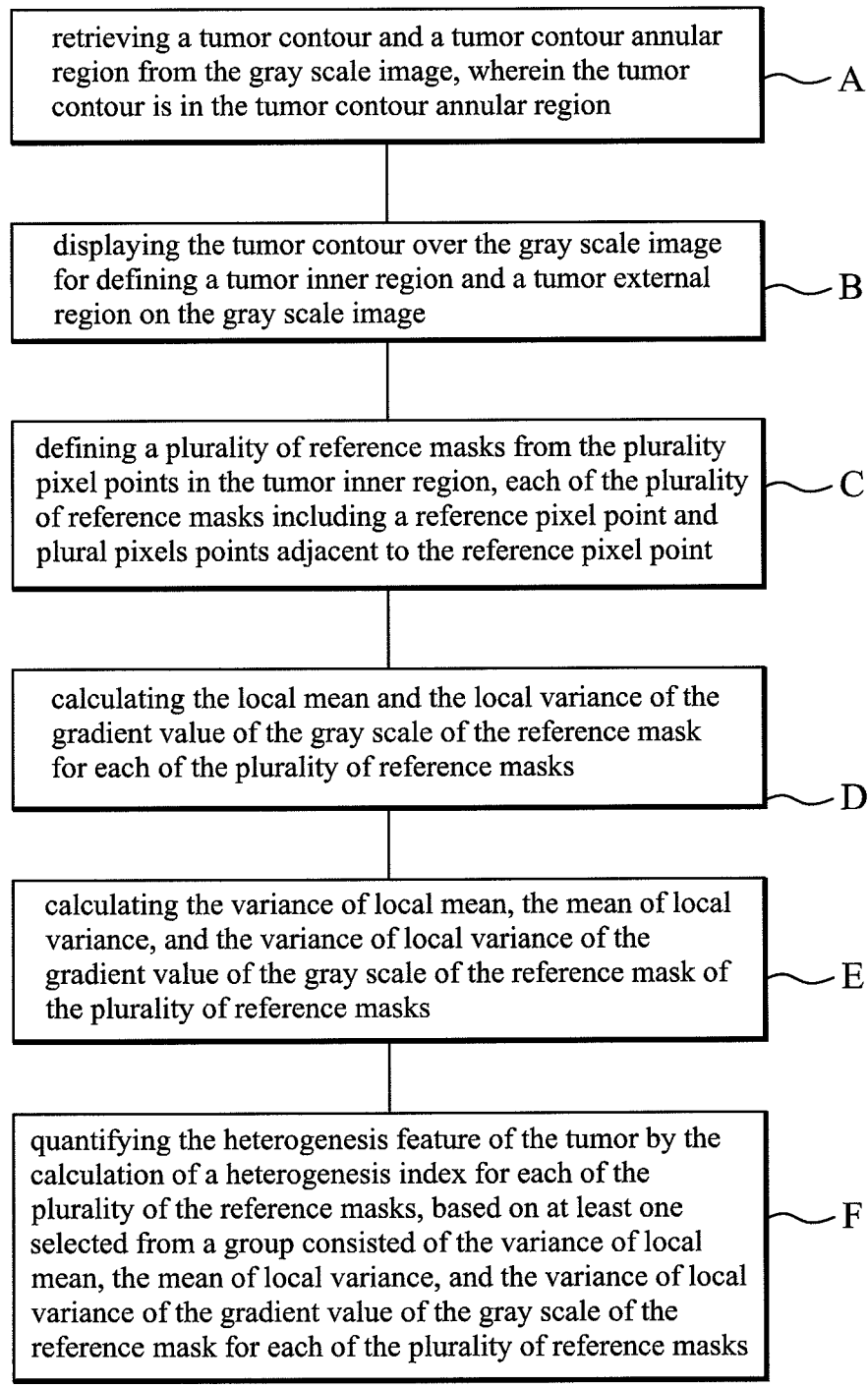
FIG. 11B is a flowchart of the quantification method of the heterogenesis feature of a tumor according to the eighth embodiment of the present invention.

As shown in FIG. 11B, which is a flowchart of the quantification method of the heterogenesis feature of a tumor according to the eighth embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) defining a plurality of reference masks from the plurality pixel points in the tumor inner region, each of the plurality of reference masks including a reference pixel point and plural pixels points adjacent to the reference pixel point;

(D) calculating the local mean and the local variance of the gradient value of the gray scale of the reference mask for each of the plurality of reference masks;

(E) calculating the variance of local mean, the mean of local variance, and the variance of local variance of the gradient value of the gray scale of the reference mask of the plurality of reference masks; and (F) quantifying the heterogenesis feature of the tumor by the calculation of a heterogenesis index for each of the plurality of the reference masks, based on at least one selected from a group consisted of the variance of local mean, the mean of local variance, and the variance of local variance of the gradient value of the gray scale of the reference mask for each of the plurality of reference masks.

However, since the tumor contour and the tumor contour annular region retrieved from the gray scale image of step (A) and the tumor inner region and the tumor external region defined by the tumor contour of step (B) have been described above, the detailed description of them is omitted herein.

Besides, in the present embodiment, the reference mask of step (C) includes 25 pixel points, i.e. the reference pixel point and plural pixels points adjacent to the reference pixel point. The difference between the coordinate of these pixel points (x',y') and the coordinate of the reference pixel points (x,y) is smaller than 2. It should be noticed that, in other application case, the reference mask of step (C) could include different number of pixel points, for example, 49 pixel points.

Below, the calculation of the variance of local mean (VOM), the mean of local variance (MOV), and the variance of local variance (VOV), based on the variance, the local mean and the local variance of the gradient value of the gray scale of the reference mask for each of the plurality of reference masks is described.

First, the variance of local mean (VOM) interprets the changes of the local means. That is, the variance of local mean (VOM) is calculated as the variance among the local averages. Second, the variance of local variance (VOV) interprets the scale of difference in the local area. That is, the variance of local variance (VOV) is calculated as the mean among the variances in local area. Third, the mean of local variance (MOV) interprets the changes among the differences in the local area. That is, the mean of local variance (MOV) is calculated as the variance among the variances in local area.

An example for explaining the calculation of these three kinds of variance is presented below.

At the beginning, a local squared-area (i.e. the reference mask) of an ultrasonic gray scale image is defined (denoted as $A_{i,j}{}^q$), for the measurement point $P_{i,j}$ which consists of $(2q+1) \times (2q+1)$ measurement points, where q is said to be the element to decide the width of the squared-area. Besides, the components within $A_{i,j}{}^q$ can be shown as:

$$A_{i,j}^q = \begin{Bmatrix} P_{i-q,j-q} & \cdots & p_{i,j-q} & \cdots & P_{i+q,j-q} \\ \vdots & \ddots & \vdots & \ddots & \vdots \\ P_{i-q,j} & \cdots & P_{i,j} & \cdots & P_{i+q,j} \\ \vdots & \ddots & \vdots & \ddots & \vdots \\ P_{i-q,j+q} & \cdots & P_{i,j+q} & \cdots & P_{i+q,j+q} \end{Bmatrix},$$

The sample mean of the points within $A_{i,j}{}^q$ is defined as the local mean, denoted $\mu_{A_{i,j}^q}^2$ as can be calculated as:

$$\mu_{A_{i,j}^q}^2 = \frac{\sum_{i'=i-q}^{i+q} \sum_{j'=j-q}^{j+q} (GR_{i',j'})}{(2q+1)^2}.$$

$GR_{i,j}$ is the brightness of the $P_{i,j}$ at the single frame at a constant of timepoint.

The sample variance of the points within $A_{i,j}{}^q$ is defined as the local variance, denoted as $S_{A_{i,j}^q}^2$ can be calculated as:

$$s_{A_{i,j}^q}^2 = \frac{\sum_{i'=i-q}^{i+q} \sum_{j'=j-q}^{j+q} \left(GR_{i',j'} - \mu_{A_{i,j}^q}^2\right)}{(2q+1)^2 - 1}.$$

However, when $A_{i,j}{}^q$ contains the points that are outside the ROI, the $\mu_{A_{i,j}^q}^2$ and $S_{A_{i,j}^q}^2$ for the area $A_{i,j}{}^q$ will not be calculated.

Based on pre-defined region of interest (ROI), in this case, the tumor inner region, and a given q, in the case, q=2, the $n_q$ local means (denoted as $\mu_{A_v^q}^2$) and the $n_q$ local variances (denoted as $S_{A_v^q}^2$), where $1 \le v \le n_q$.

Therefore, the variance of local mean (VOM) could be calculated as $$VOM_q = \frac{\sum_{v=1}^{n_q} \left(\mu_{A_v^q}^2 - \overline{\mu_{A_v^q}^2}\right)}{n_q - 1},$$

$$\text{where } \overline{\mu_{A_v^q}^2} = \frac{\sum_{v=1}^{n_q} \mu_{A_v^q}^2}{n_q}.$$

The mean of local variance (MOV) could be calculated as:

$$MOV_q = \frac{\sum_{v=1}^{n_q} \left(s_{A_v^q}^2\right)}{n_q}.$$

The variance of local variance (VOV) could be calculated as:

$$VOV_q = \frac{\sum_{v=1}^{n_q} \left(s_{A_v^q}^2 - \overline{s_{A_v^q}^2}\right)}{n_q - 1},$$

$$\text{where } \overline{s_{A_v^q}^2} = \frac{\sum_{v=1}^{n_q} s_{A_v^q}^2}{n_q}.$$

As a result, the calculation of the local mean (VOM), the mean of local variance (MOV), the variance of local variance (VOV), as well as the ratio of the variance of local variance (VOV) divided by the variance of local mean (VOM), the ratio of the mean of local variance (MOV) divided by the variance of local variance (VOV), and the ratio of the mean of local variance (MOV) divided by the variance of local mean (VOM) are disclosed.

Among these 6 forms of the heterogenesis index, the one in which the heterogenesis index is a function of the ratio of the variance of local variance (VOV) divided by the variance of local mean (VOM) has the best performance.

Figure 12A:
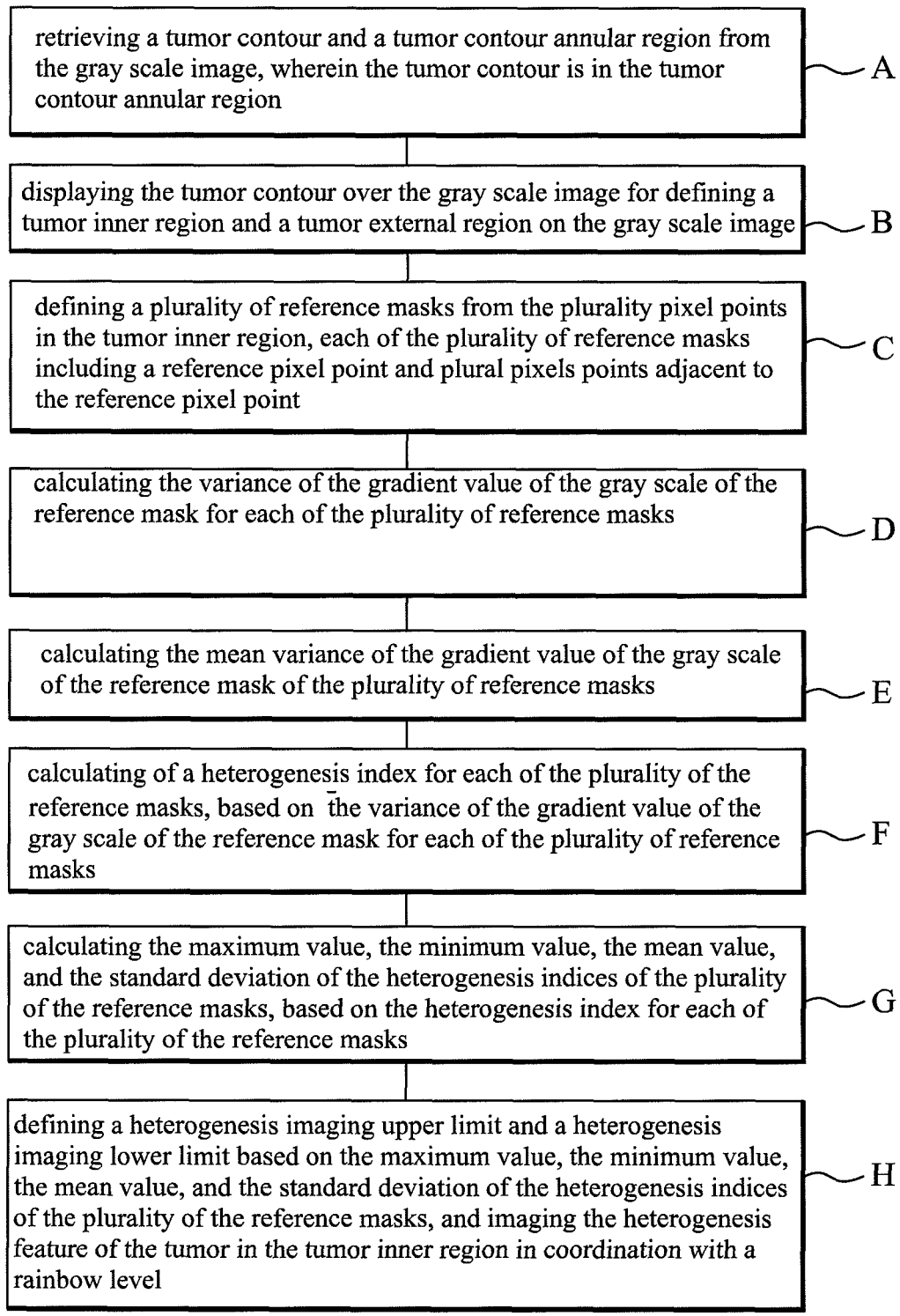
FIG. 12A is a flowchart of the imaging method of the heterogenesis feature of a tumor according to the ninth embodiment of the present invention.

As shown in FIG. 12A, which is a flowchart of the imaging method of the heterogenesis feature of a tumor according to the ninth embodiment of the present invention, comprising the steps of:

(A) retrieving a tumor contour and a tumor contour annular region from the gray scale image, wherein the tumor contour is in the tumor contour annular region;

(B) displaying the tumor contour over the gray scale image for defining a tumor inner region and a tumor external region on the gray scale image;

(C) defining a plurality of reference masks from the plurality pixel points in the tumor inner region, each of the plurality of reference masks including a reference pixel point and plural pixels points adjacent to the reference pixel point;

(D) calculating the variance of the gradient value of the gray scale of the reference mask for each of the plurality of reference masks;

(E) calculating the mean variance of the gradient value of the gray scale of the reference mask of the plurality of reference masks;

(F) calculating of a heterogenesis index for each of the plurality of the reference masks, based on the variance of the gradient value of the gray scale of the reference mask for each of the plurality of reference masks;

(G) calculating the maximum value, the minimum value, the mean value, and the standard deviation of the heterogenesis indices of the plurality of the reference masks, based on the heterogenesis index for each of the plurality of the reference masks; and (H) defining a heterogenesis imaging upper limit and a heterogenesis imaging lower limit based on the maximum value, the minimum value, the mean value, and the standard deviation of the heterogenesis indices of the plurality of the reference masks, and imaging the heterogenesis feature of the tumor in the tumor inner region in coordination with a rainbow level.

However, since the tumor contour and the tumor contour annular region retrieved from the gray scale image of step (A) and the tumor inner region and the tumor external region defined by the tumor contour of step (B) have been described above, the detailed description of them is omitted herein. Moreover, since the calculating method of the maximum value, the minimum value, the mean value, and the standard deviation of the heterogenesis indices of the plurality of the reference masks, based on the heterogenesis index for each of the plurality of the reference masks of step (G) is well-known in the art, the detailed steps of the method is omitted herein.

Besides, in the present embodiment, the reference mask of step (C) includes 25 pixel points, i.e. the reference pixel point and plural pixels points adjacent to the reference pixel point. The difference between the coordinate of these pixel points (x',y') and the coordinate of the reference pixel points (x,y) is smaller than 2. It should be noticed that, in other application case, the reference mask of step (C) could include different number of pixel points, for example, 49 pixel points.

The variance of the gradient value of the gray scale of the reference mask for each of the plurality of reference masks calculated in step (D) is represented by $_{varp}MHI_i$. The mean variance of the gradient value of the gray scale of the reference mask of the plurality of reference masks calculated in step (E) is represented by $_{MOV}MHI_i$. Besides, $$_{MOV}MHI_i = \frac{\sum_{z=1}^{z'} {_{varp}MHI_{iz}}}{z'}$$

As shown in FIG. 11C, the step (F) of the quantification method of the heterogenesis feature of a tumor of the present embodiment includes a step (F1), by taking the square roots of the absolute value of the difference between the variance of the gradient value of the gray scale of the reference mask ($_{varp}MHI_i$) for each of the plurality of reference masks and the mean variance of the gradient value of the gray scale of the reference mask ($_{MOV}MHI_i$) of the plurality of reference masks, calculating the heterogenesis index $HP_{iz}$ for each of the plurality of the reference masks, as shown in the following formula:

$$HP_{iz} = \sqrt{|_{varp}MHI_{iz} - {_{MOV}MHI_i}|}$$

Besides, as shown in FIG. 11C, the step (F) of the quantification method of the heterogenesis feature of a tumor of the present embodiment includes a step (F2) following the step (F1), defining a threshold value for calculating the ratio of the region having the heterogenesis feature over the tumor inner region, based on the heterogenesis index ($HP_{iz}$) for each of the plurality of the reference masks.

In the present embodiment, the heterogenesis imaging upper limit of step (H) is the maximum value of the heterogenesis indices ($_{max}HP_i$) of the plurality of the reference masks; and the heterogenesis imaging lower limit is the mean value of the heterogenesis indices ($_{mean}HP_i$) of the plurality of the reference masks, minus 0.1 times of the standard deviation ($_{std}HP_i$) of the heterogenesis indices of the plurality of the reference masks (i.e. $_{mean}HP_i - 0.1 \times {_{std}HP_i}$).

It should be noticed that, in other application case, the heterogenesis imaging upper limit and the heterogenesis imaging lower limit could have other value, respectively. For example, the heterogenesis imaging upper limit could be the maximum value of the heterogenesis indices ($_{max}HP_i$) of the plurality of the reference masks, minus 0.1 times of the standard deviation ($_{std}HP_i$) of the heterogenesis indices of the plurality of the reference masks (i.e. $_{max}HP_i 0.1 - \times {_{std}HP_i}$). The heterogenesis imaging lower limit could be the mean value of the heterogenesis indices ($_{mean}HP_i$) of the plurality of the reference masks, minus 0.2 times of the standard deviation ($_{std}HP_i$) of the heterogenesis indices of the plurality of the reference masks (i.e. $_{mean}HP_i - 0.2 \times {_{std}HP_i}$). The only requirement is that the heterogenesis imaging upper limit must be larger than the heterogenesis imaging lower limit.

Besides, the rainbow level used in step (H) of the imaging method of the heterogenesis feature of a tumor of the present embodiment is a level changing continuously from red to purple, through orange, yellow, green, blue, and indigo. While the heterogenesis feature of the tumor is imaged, the reference pixel point of each of the plurality of reference masks are imaged according to the imaging rules below:

1. If a reference mask having the heterogenesis index equal to the heterogenesis imaging upper limit, the reference pixel point of the reference mask is covered by a red block;
2. f a reference mask having the heterogenesis index smaller than or equal to the heterogenesis imaging lower limit, the reference pixel point of the reference mask is covered by a purple block; and
3. If a reference mask having the heterogenesis index between the heterogenesis imaging upper limit and the heterogenesis imaging lower limit, the reference pixel point of the reference mask is covered by a block having the color selected from the rainbow level corresponding to the relation among the heterogenesis index of the reference mask, the heterogenesis imaging upper limit and the heterogenesis imaging lower limit.

Figure 12B:
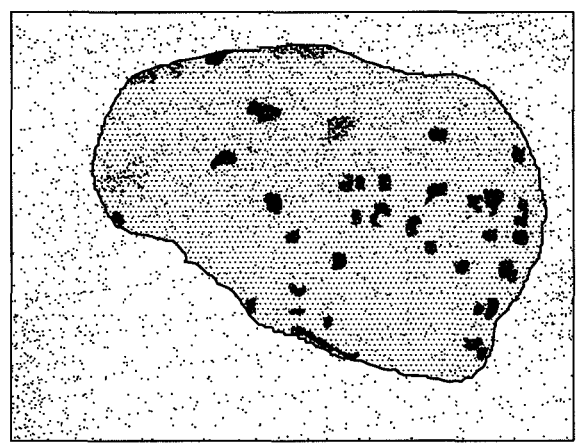
FIG. 12B displays a image pattern displaying the heterogenesis feature of a tumor.

After the reference pixel point of each of the plurality of reference masks are imaged according to the imaging rules above, an image pattern having the heterogenesis feature imaged is obtained, as shown in FIG. 12B. With the assistance of the image pattern of FIG. 12B, a doctor can easily discover the distribution of the heterogenesis feature of the tumor and the ratio of the heterogenesis feature in the tumor inner region.

It should be noticed that the color blocks of the imaging pattern of FIG. 12B can not only displays on the ultrasonic gray scale image continuously, it can also displays on the ultrasonic gray scale image periodically. Thus, the doctor can observe other features of the tumor while the heterogenesis feature is imaged.

As described above, with the quantification method of the margin feature of a tumor, the imaging method of the margin feature of a tumor, the quantification method of the cysts feature of a tumor, the imaging method of the cysts feature of a tumor, the quantification method of the calcifications feature of a tumor, the imaging method of the calcifications feature of a tumor, the quantification method of the echoic feature of a tumor, the quantification method of the heterogenesis feature of a tumor, and the imaging method of the heterogenesis feature of a tumor, a doctor can obtain both the quantified result of these features and the imaging result of these features (in the form of image pattern) at the same time when the ultrasonic gray scale image is available to him, as the reference for the doctor to diagnose the nature of the tumor. Thus, both the accuracy and the reliability of the diagnosis of the nature of a tumor thorough the ultrasonic gray scale image can thus be increased. The burden of the doctor on the diagnosis of the nature of a tumor is also released.

Moreover, the steps of the quantification method of the margin feature of a tumor, the imaging method of the margin feature of a tumor, the quantification method of the cysts feature of a tumor, the imaging method of the cysts feature of a tumor, the quantification method of the calcifications feature of a tumor, the imaging method of the calcifications feature of a tumor, the quantification method of the echoic feature of a tumor, the quantification method of the heterogenesis feature of a tumor, and the imaging method of the heterogenesis feature of a tumor provided by the present invention can be compose into computer language for be executed by the computer system. The computer program of the above methods can be stored in a computer readable medium capable of being indentified or read by any kind of processor, or any object or any device including the computer readable medium therein. The type of the object or the device is not limited; it could be a hard drive, soft drive, a CD-ROM, ZIP, MO, IC chip, or RAM. The computer system is not limited to the ordinary form of the computer system, it could also be a cellphone, palm computer, smart phone, PDA, etc.

Although the present invention has been explained in relation to its preferred embodiment, it is to be understood that many other possible modifications and variations can be made without departing from the scope of the invention as hereinafter claimed.

What is claimed is:

1. A quantification method of a cysts feature of a tumor executed by a computer system including a display device, a processor, a memory, an input device, and a storage device, applying on a gray scale image consisting of a plurality of pixel points and displaying at least one tumor therein, comprising the steps of:
   (A) retrieving, by a processor, a tumor contour and a tumor contour annular region from the gray scale image, wherein the tumor contour is in the tumor contour annular region;
   (B) displaying, by a display device, the tumor contour over the gray scale image for defining a tumor inner region and a tumor external region on the gray scale image, wherein the tumor inner region is the region enclosed by the tumor contour;
   (C) calculating, by the processor, both the minimum value and the standard deviation of the gradient value of the gray scale of the plurality pixel points in the tumor inner region;
   (D) quantifying, by the processor, a cysts feature of the tumor in the tumor inner region based on a threshold value defined by the minimum value of the gradient value of the gray scale of the plurality pixel points in the tumor inner region plus a multiple, not equal to one, of the standard deviation of the gradient value of the gray scale of the plurality pixel points in the tumor inner region, and calculating, by the processor, the ratio of the region having the cysts feature over the tumor inner region,
   wherein when one of the plurality pixel points in the tumor inner region has a gradient value of the gray scale smaller than the threshold value, the pixel point is defined as belonging to the cysts feature; and
   (E) displaying, by the display device, an image pattern including the cysts feature of the tumor.

2. An imaging method of a cysts feature of a tumor executed by a computer system including a display device, a processor, a memory, an input device, and a storage device, applying on a gray scale image consisting of a plurality of pixel points and displaying at least one tumor therein, comprising the steps of:
   (A) retrieving, by a processor, a tumor contour and a tumor contour annular region from the gray scale image, wherein the tumor contour is in the tumor contour annular region;
   (B) displaying, by a display device, the tumor contour over the gray scale image for defining a tumor inner region and a tumor external region on the gray scale image, wherein the tumor inner region is the region enclosed by the tumor contour;
   (C) calculating, by the processor, both the minimum value and the standard deviation of the gradient value of the gray scale of the plurality pixel points in the tumor inner region; and
   (D) defining, by the processor, a cysts imaging upper limit and a cysts imaging lower limit, imaging a cysts feature of the tumor in the tumor inner region based on said defining, and displaying, by the display device, an image pattern including the cysts feature of the tumor,
   wherein the cysts imaging upper limit is a value defined by the minimum value of the gradient value of the gray scale of the plurality pixel points in the tumor inner region plus a multiple, not equal to one, of the standard deviation of the gradient value of the gray scale of the plurality pixel points in the tumor inner region, and the cysts imaging lower limit is the minimum value of the gradient value of the gray scale of the plurality pixel points in the tumor inner region,
   wherein the cysts imaging upper limit is greater than the cysts imaging lower limit, and
   wherein when the gradient value of the gray scale of a pixel point in the tumor inner region is between the cysts imaging upper limit and the cysts imaging lower limit, the pixel point is defined as belonging to the cysts feature.

3. The imaging method as claimed in claim 2, wherein, when a pixel point in the tumor inner region having the gradient value of the gray scale between the cysts imaging upper limit and the cysts imaging lower limit, the pixel point is covered by a peach block after the cysts feature of the tumor is imaged.

4. The imaging method as claimed in claim 2, further comprising steps (E) and (F) following step (D):
   (E) defining a plurality of reference masks from the plurality pixel points in the tumor inner region, each of the plurality of reference masks including a reference pixel point and plural pixels points adjacent to the reference pixel point, wherein the gradient value of the gray scale of the reference pixel point is between the cysts imaging upper limit and the cysts imaging lower limit; and
   (F) covering the reference pixel point and all the plural pixels points with a peach block after the gradient value of the gray scale of at least one of the plural pixels points is between the cysts imaging upper limit and the cysts imaging lower limit and the cysts feature of the tumor is imaged.

5. The imaging method as claimed in claim 4, further comprising a step (G) following the step (F):
   (G) removing the peach block covering the reference pixel point and all the plural pixels points while only the gradient value of the gray scale of the reference pixel point is between the cysts imaging upper limit and the cysts imaging lower limit and the cysts feature of the tumor is imaged.

6. A quantification method of a calcifications feature of a tumor executed by a computer system including a display device, a processor, a memory, an input device, and a storage device, applying on a gray scale image consisting of a plurality of pixel points and displaying at least one tumor therein, comprising the steps of:

(A) retrieving, by a processor, a tumor contour and a tumor contour annular region from the gray scale image, wherein the tumor contour is in the tumor contour annular region;

(B) displaying, by a display device, a tumor contour over the gray scale image for defining a tumor inner region and a tumor external region on the gray scale image, wherein the tumor inner region is the region enclosed by the tumor contour;

(C) calculating, by the processor, both the minimum value and the standard deviation of the gradient value of the gray scale of the plurality of pixel points in the tumor inner region;

(D) retrieving, by the processor, a cysts region in the tumor inner region based on a threshold value defined by the minimum value of the gradient value of the gray scale of the plurality pixel points in the tumor inner region plus a multiple, not equal to one, of the standard deviation of the gradient value of the gray scale of the plurality pixel points in the tumor inner region;

(E) calculating, by the processor, the maximum value, the standard deviation, and the mean value of the gradient value of the gray scale of the plurality pixel points in the tumor inner region but outside the cysts region;

(F) quantifying, by the processor, a calcifications feature of the tumor in the tumor inner region based on a threshold value defined by the mean value of the gradient value of the gray scale of the plurality pixel points in the tumor inner region but outside the cysts region plus a multiple, not equal to one, of the standard deviation of the gradient value of the gray scale of the plurality pixel points in the tumor inner region but outside the cysts region, and calculating, by the processor, the ratio of the region having the calcifications feature over the tumor inner region but outside the cysts region, wherein when one of the plurality pixel points in the tumor inner region but outside the cysts region has a gradient value of the gray scale lager than the threshold value, the pixel point is defined as belonging to the calcifications feature; and (G) displaying, by the display device, an image pattern including the calcifications feature of the tumor.

7. An imaging method of a calcifications feature of a tumor executed by a computer system including a display device, a processor, a memory, an input device, and a storage device, applying on a gray scale image consisting of a plurality of pixel points and displaying at least one tumor therein, comprising the steps of:

(A) retrieving, by a processor, a tumor contour and a tumor contour annular region from the gray scale image, wherein the tumor contour is in the tumor contour annular region;

(B) displaying, by a display device, a tumor contour over the gray scale image for defining a tumor inner region and a tumor external region on the gray scale image, wherein the tumor inner region is the region enclosed by the tumor contour;

(C) calculating, by the processor, both the minimum value and the standard deviation of the gradient value of the gray scale of the plurality of pixel points in the tumor inner region;

(D) retrieving, by the processor, a cysts region in the tumor inner region based on a threshold value defined by the minimum value of the gradient value of the gray scale of the plurality pixel points in the tumor inner region plus a multiple, not equal to one, of the standard deviation of the gradient value of the gray scale of the plurality pixel points in the tumor inner region;

(E) calculating, by the processor, the maximum value, the standard deviation, and the mean value of the gradient value of the gray scale of the plurality pixel points in the tumor inner region but outside the cysts region based on the gradient value of the gray scale of each of the plurality pixel points in the tumor inner region but outside the cysts region; and (F) defining, by the processor, a calcifications imaging upper limit and a calcifications imaging lower limit, imaging a calcifications feature of the tumor in the tumor inner region but outside the cysts region based on said defining, and displaying, by the display device, an image pattern including the calcifications feature of the tumor, wherein the calcifications imaging upper limit is the maximum value of the gradient value of the gray scale of the plurality pixel points in the tumor inner region but outside the cysts region and the calcifications imaging lower limit is the mean value of the gradient value of the gray scale of the plurality pixel points in the tumor inner region but outside the cysts region plus a multiple, not equal to one, of times of the standard deviation of the gradient value of the gray scale of the plurality pixel points in the tumor inner region but outside the cysts region, and wherein when the gradient value of the gray scale of a pixel point in the tumor inner region but outside the cysts region is between the calcifications imaging upper limit and the calcifications imaging lower limit, the pixel point is defined as the image of the calcifications feature.

8. The imaging method as claimed in claim 7, wherein the calcifications imaging upper limit is the maximum value of the gradient value of the gray scale of the plurality pixel points in the tumor inner region but outside the cysts region, and the calcifications imaging lower limit is the mean value of the gradient value of the gray scale of the plurality pixel points in the tumor inner region but outside the cysts region plus 2.8 times of the standard deviation of the gradient value of the gray scale of the plurality pixel points in the tumor inner region but outside the cysts region.

9. The imaging method as claimed in claim 7, wherein, when a pixel point in the tumor inner region but outside the cysts region having the gradient value of the gray scale between the calcifications imaging upper limit and the calcifications imaging lower limit, the pixel point is covered by a yellow block after the calcifications feature of the tumor is imaged.

* * * * *